Dec. 29, 1959  C. F. ROGIER ET AL  2,918,766
ROLL HANDLING MACHINE
Filed March 19, 1952  12 Sheets-Sheet 1
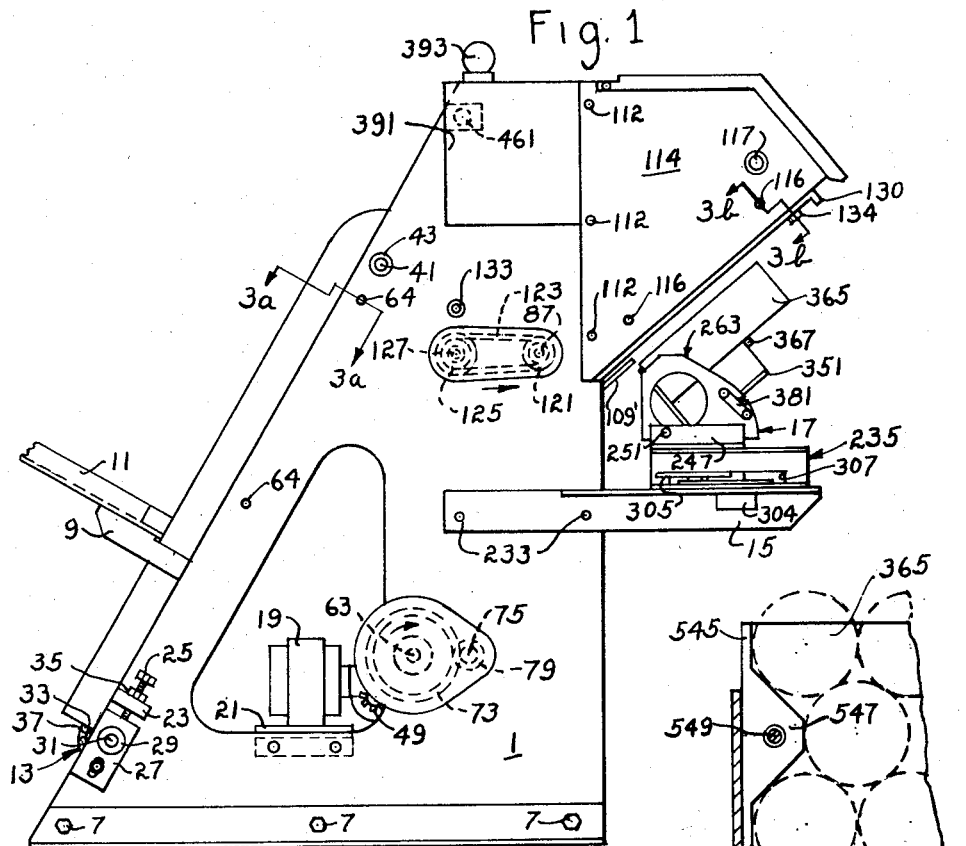
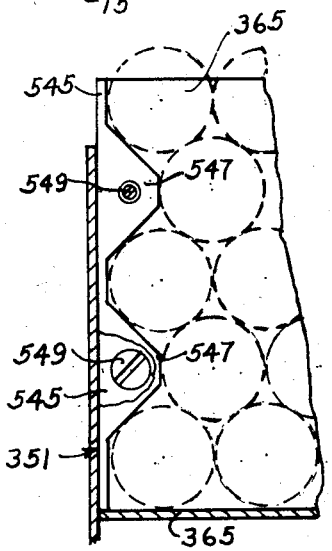
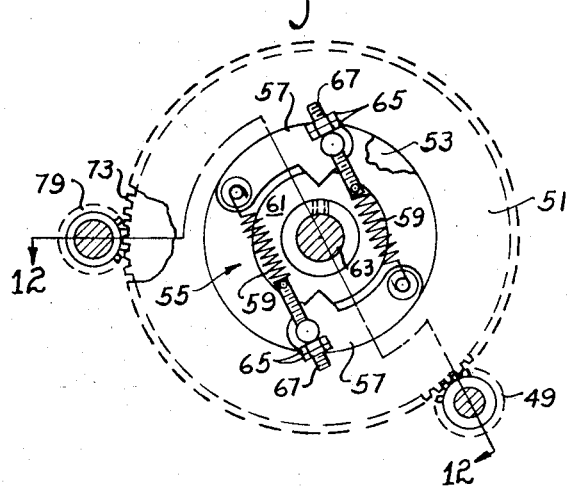
CLARENCE F. ROGIER
THOMAS E. KULO
JOSEPH SINGER
INVENTOR.
BY Edmund N. C. Kamm
ATTORNEY Dec. 29, 1959
C. F. ROGIER ET AL
2,918,766
ROLL HANDLING MACHINE
Filed March 19, 1952
12 Sheets-Sheet 2
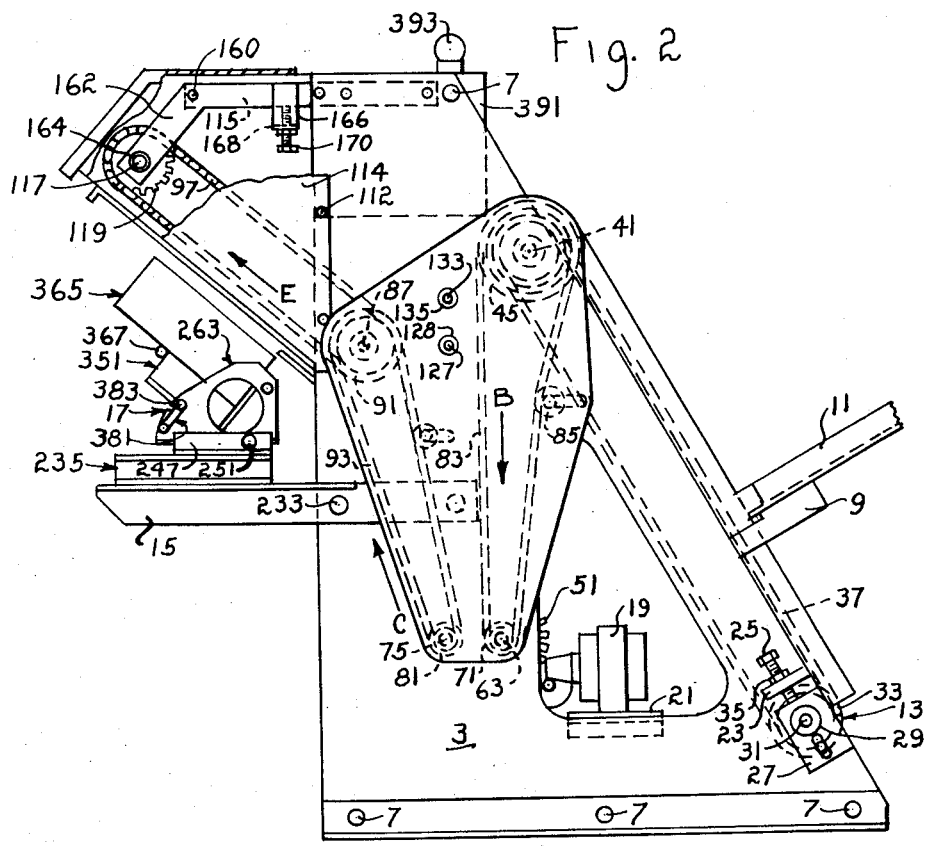
Fig. 2
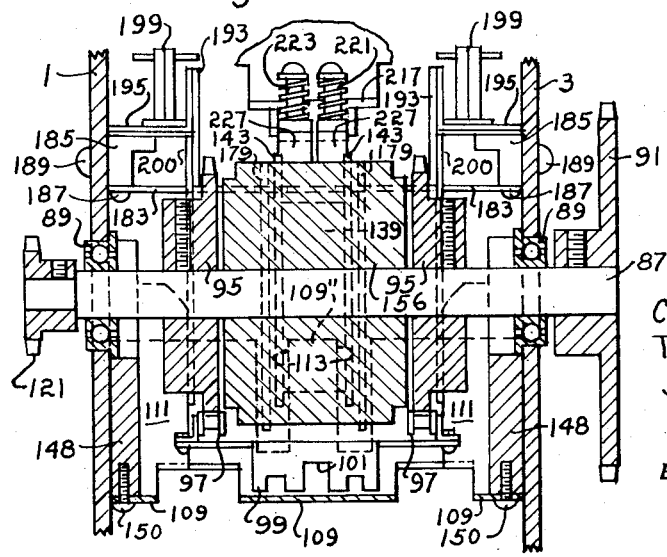
Fig. 8
Fig. 9
CLARENCE F. ROGIER
THOMAS E. KULO
JOSEPH SINGER
INVENTOR.
BY Edmund W. C. Kamm
ATTORNEY

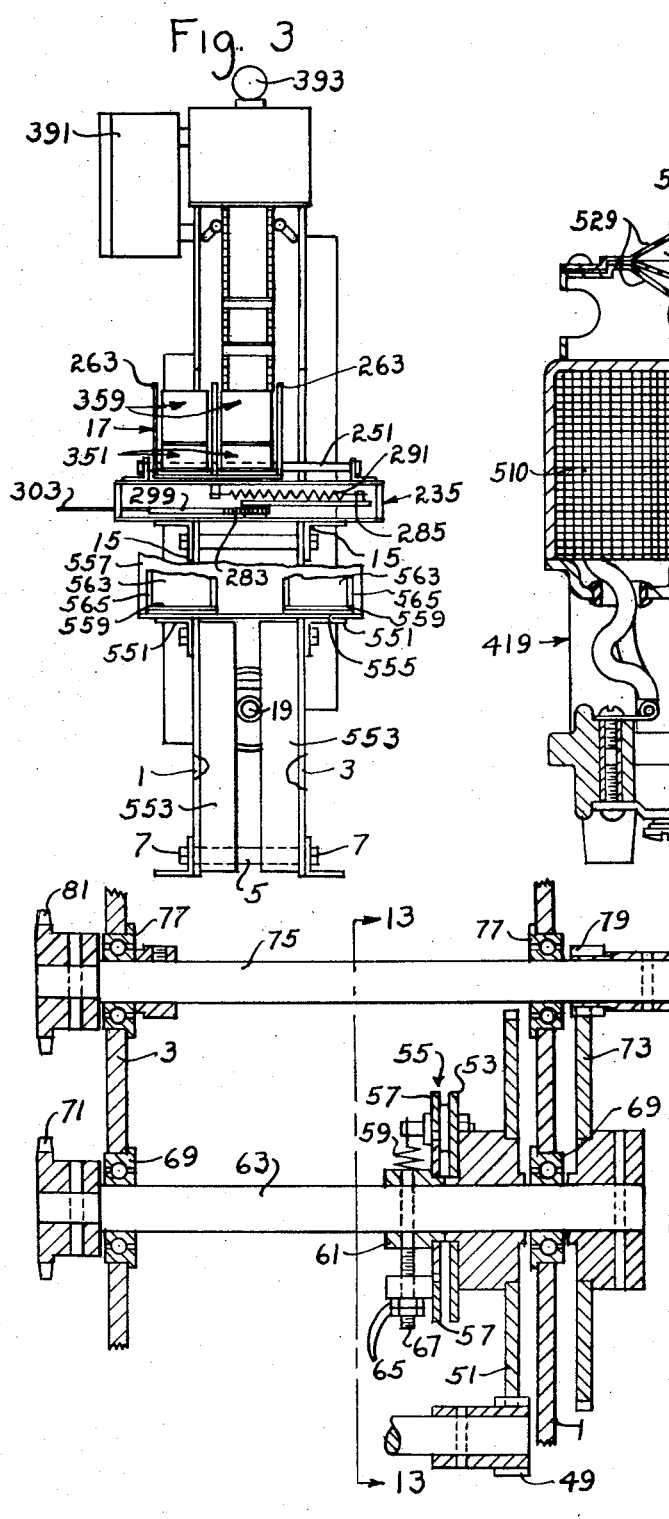
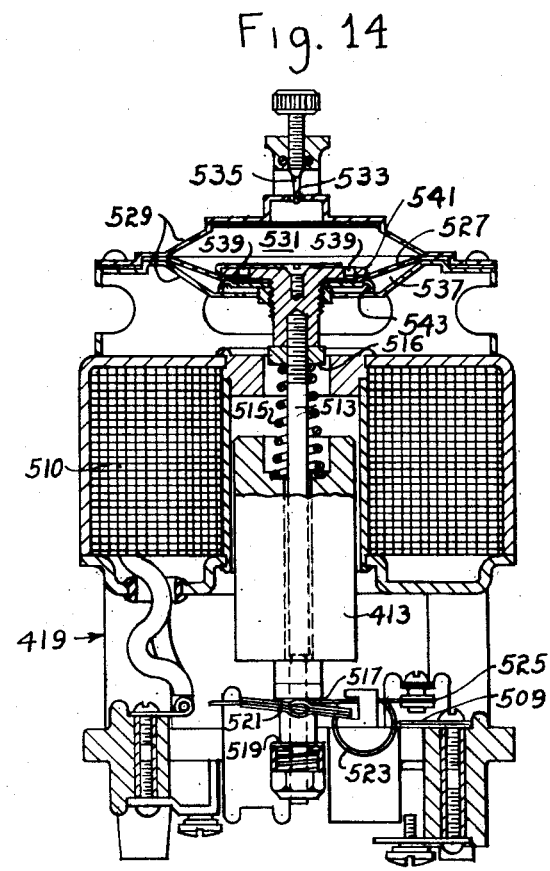

Dec. 29, 1959  C. F. ROGIER ET AL  2,918,766
ROLL HANDLING MACHINE
Filed March 19, 1952  12 Sheets—Sheet 4

CLARENCE F. ROGIER
THOMAS E. KULO
JOSEPH SINGER
INVENTOR.

BY Edmund W. E. Kamm
ATTORNEY

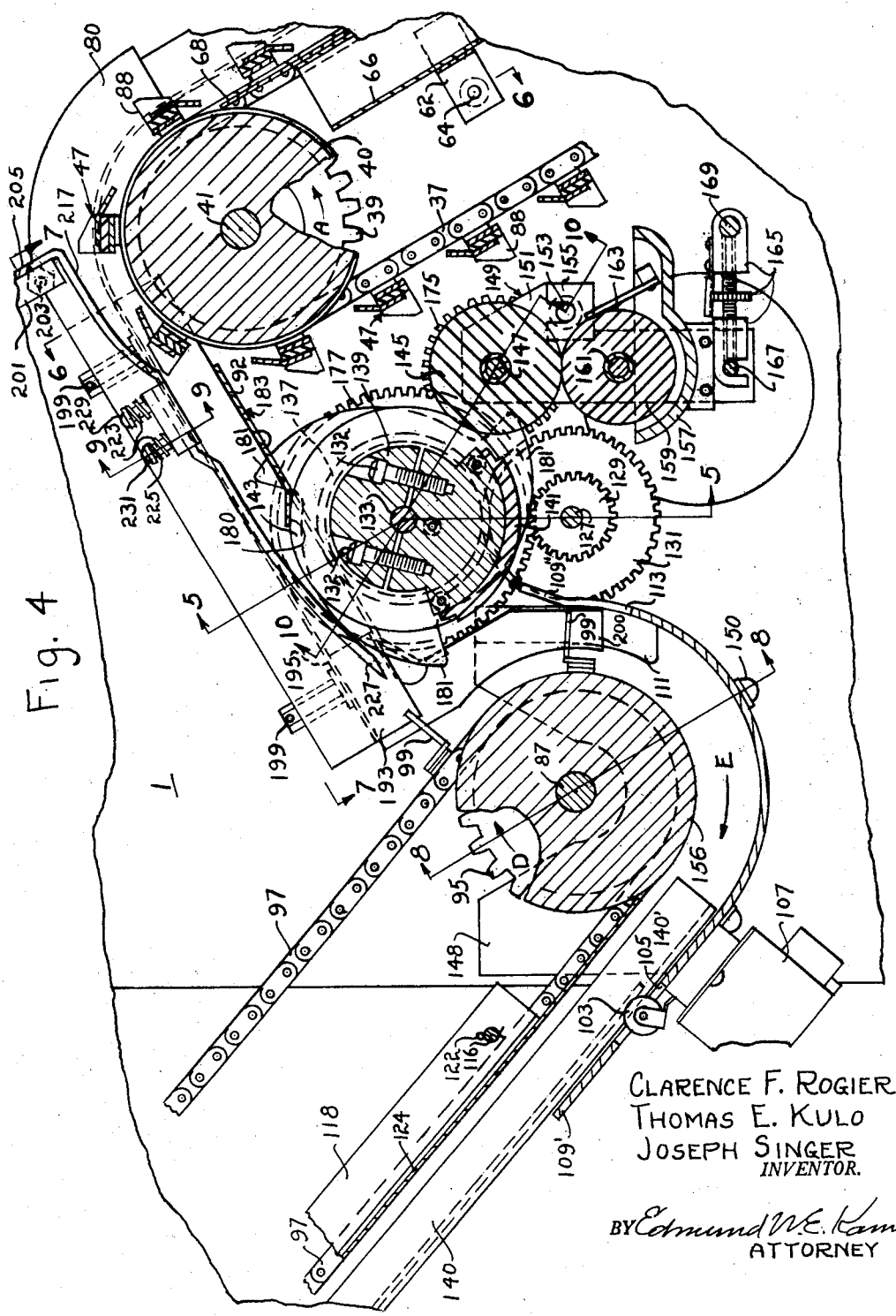

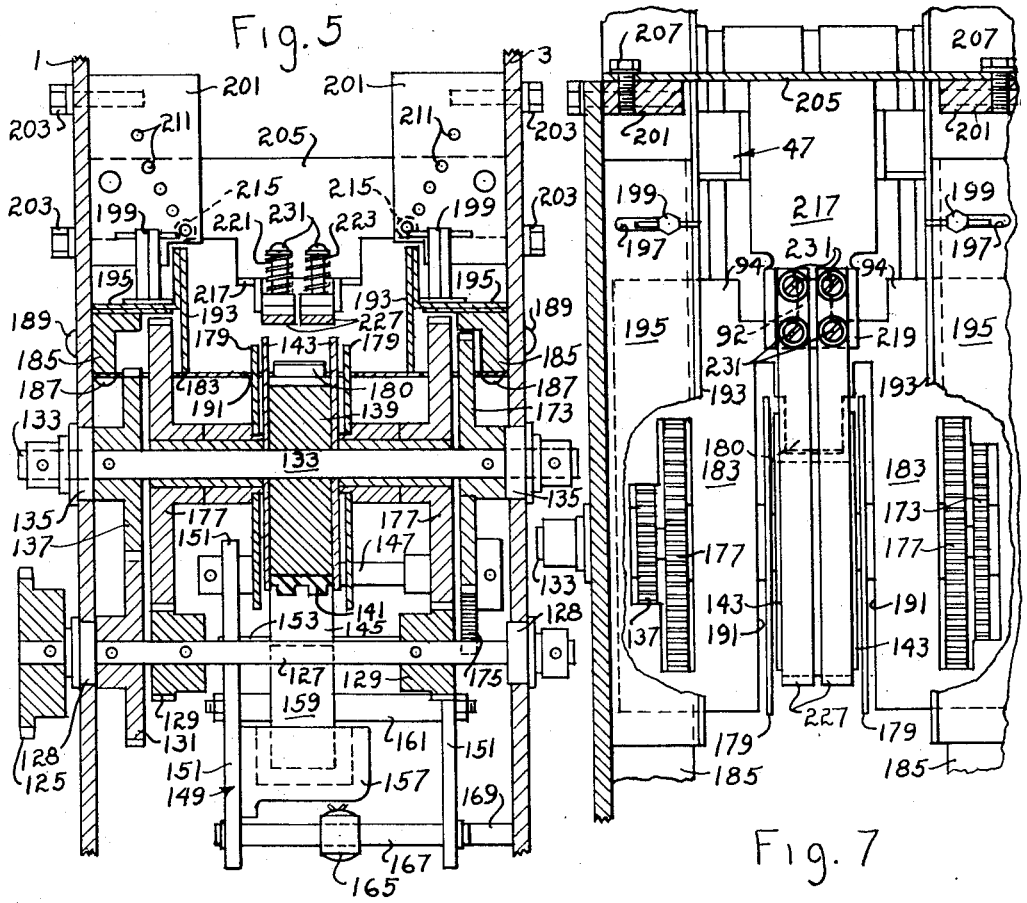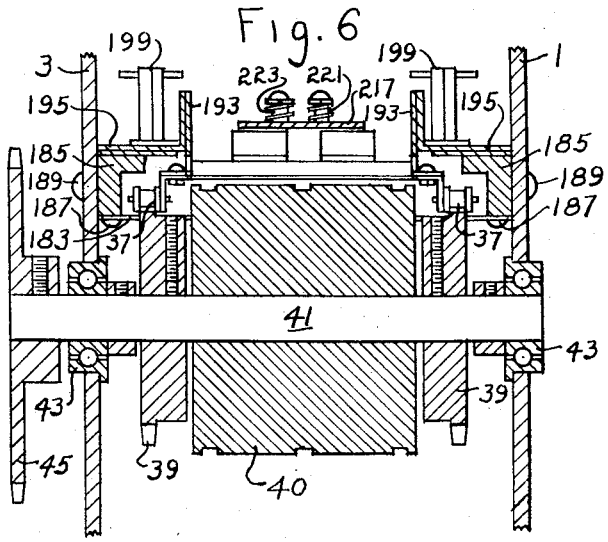

Dec. 29, 1959  C. F. ROGIER ET AL  2,918,766
ROLL HANDLING MACHINE
Filed March 19, 1952  12 Sheets-Sheet 7
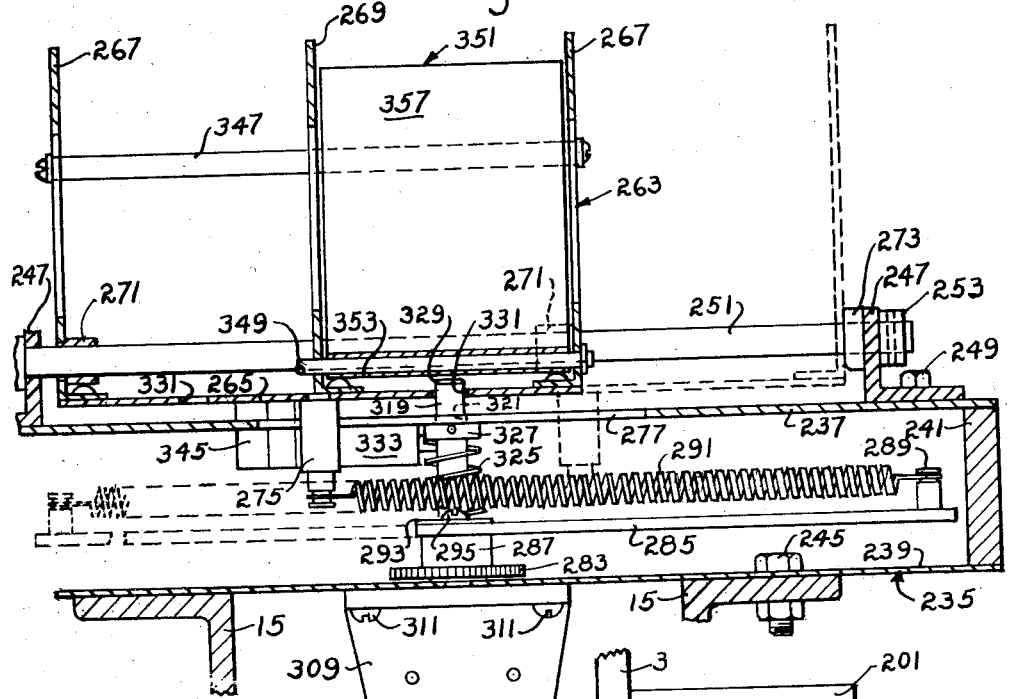
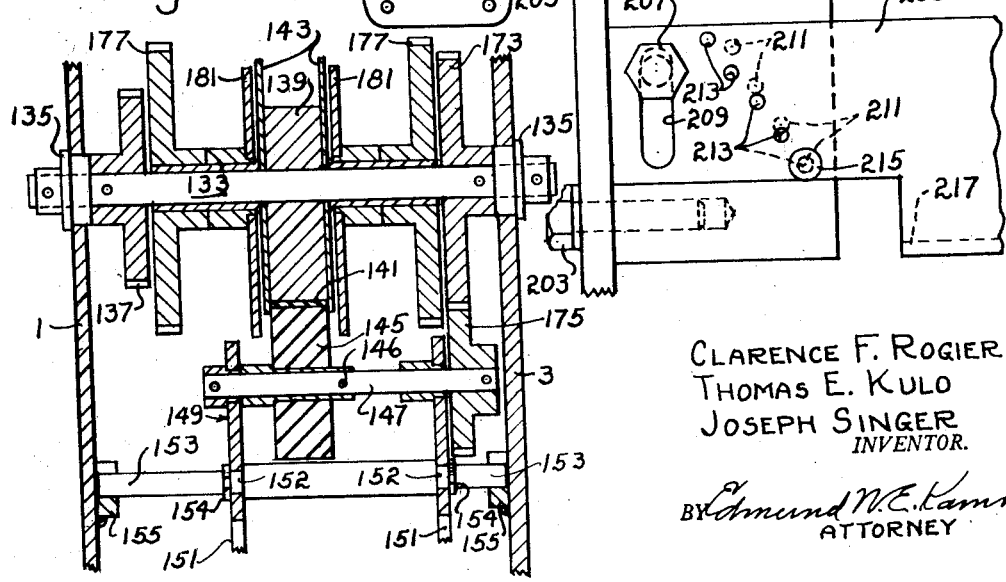
CLARENCE F. ROGIER
THOMAS E. KULO
JOSEPH SINGER
INVENTOR.
BY Edmund W. E. Kamm
ATTORNEY

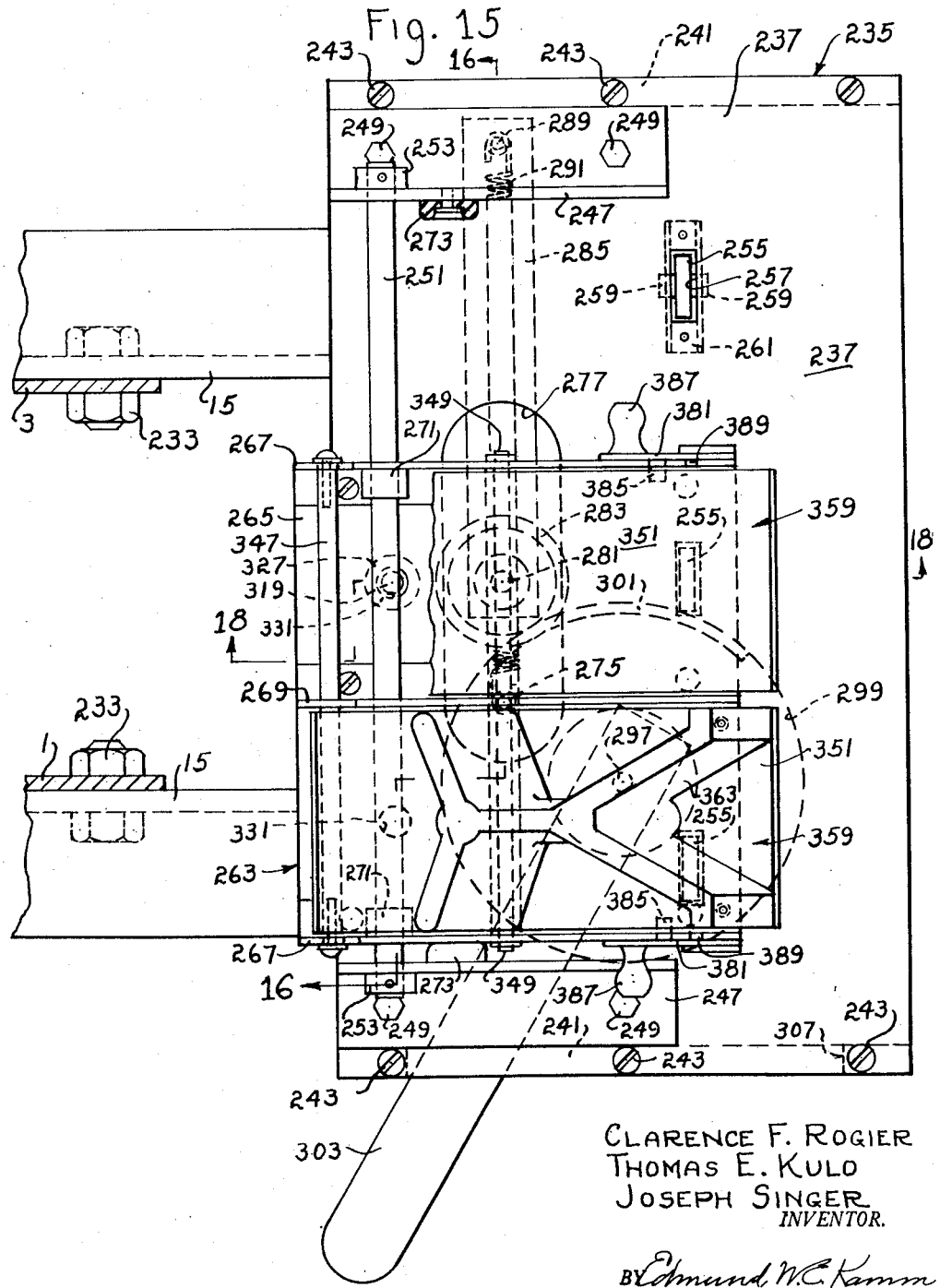

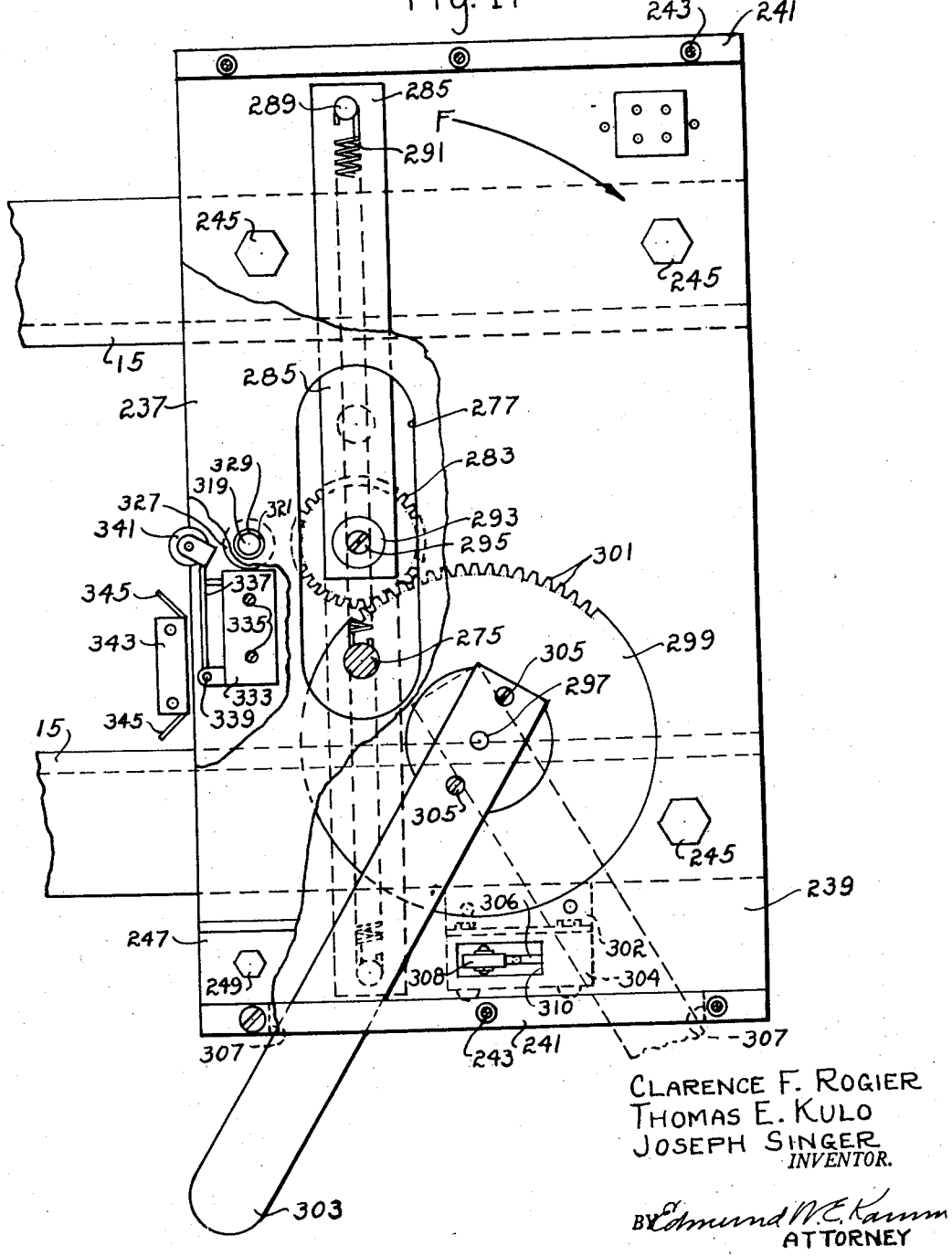

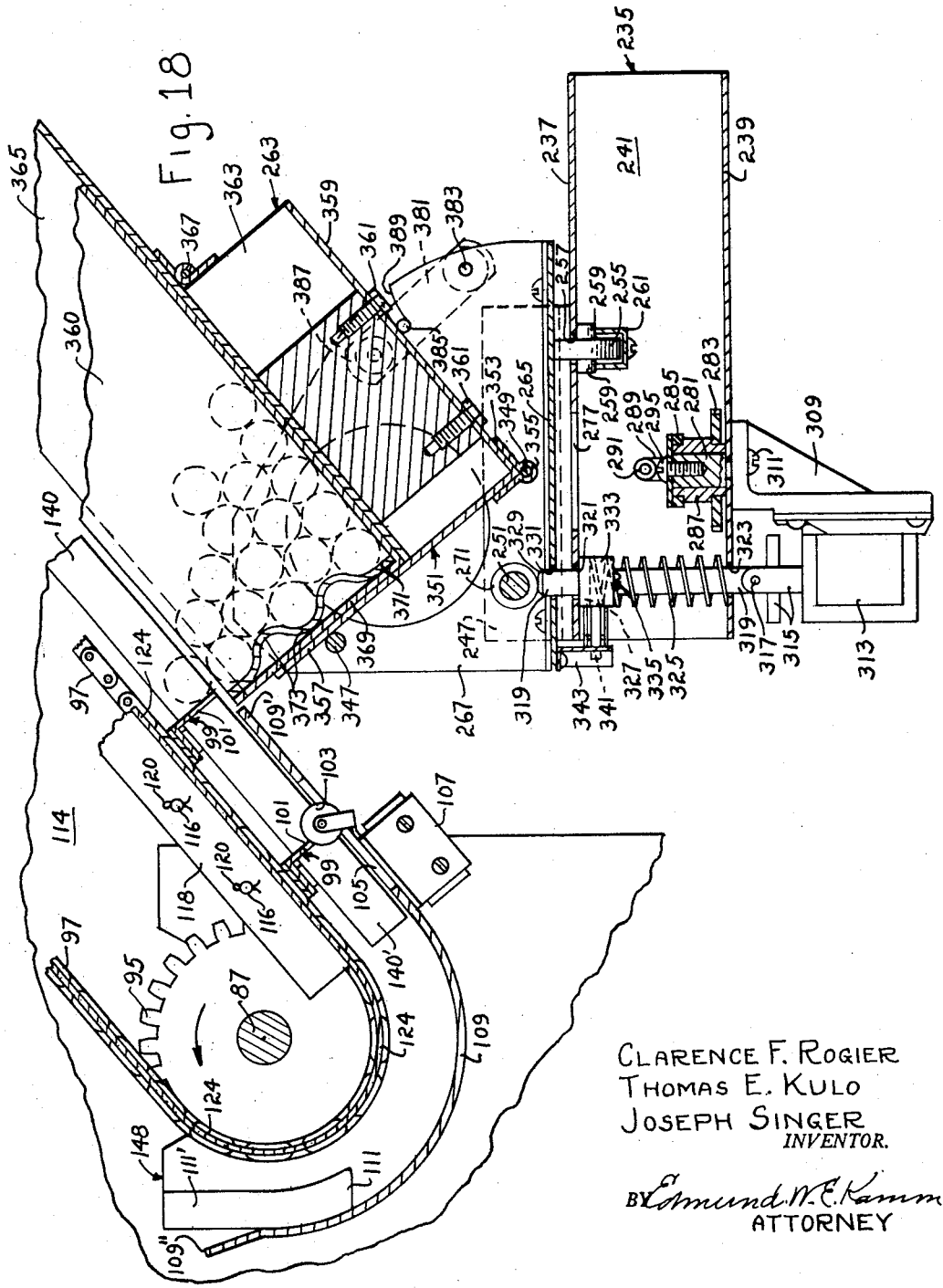

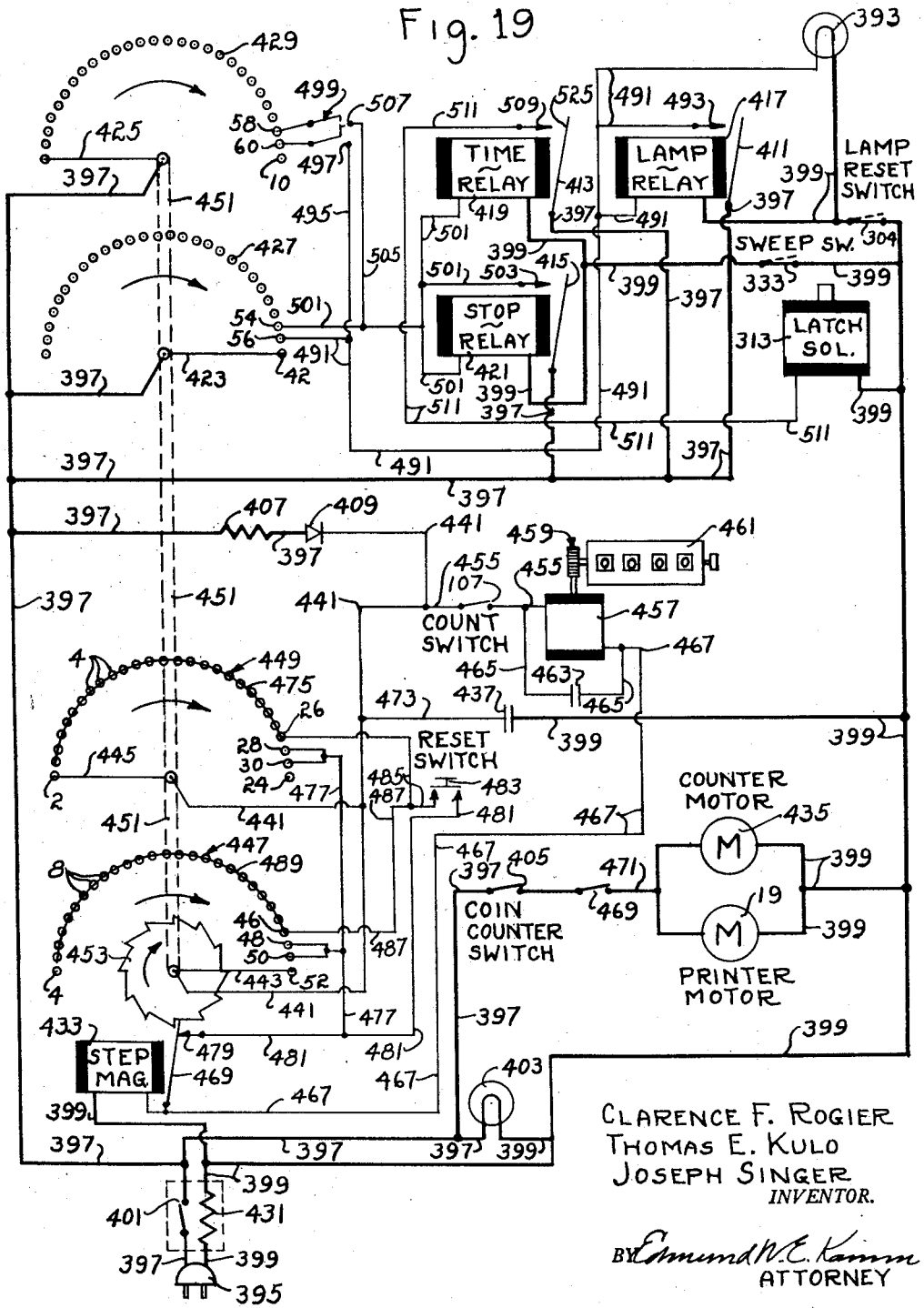

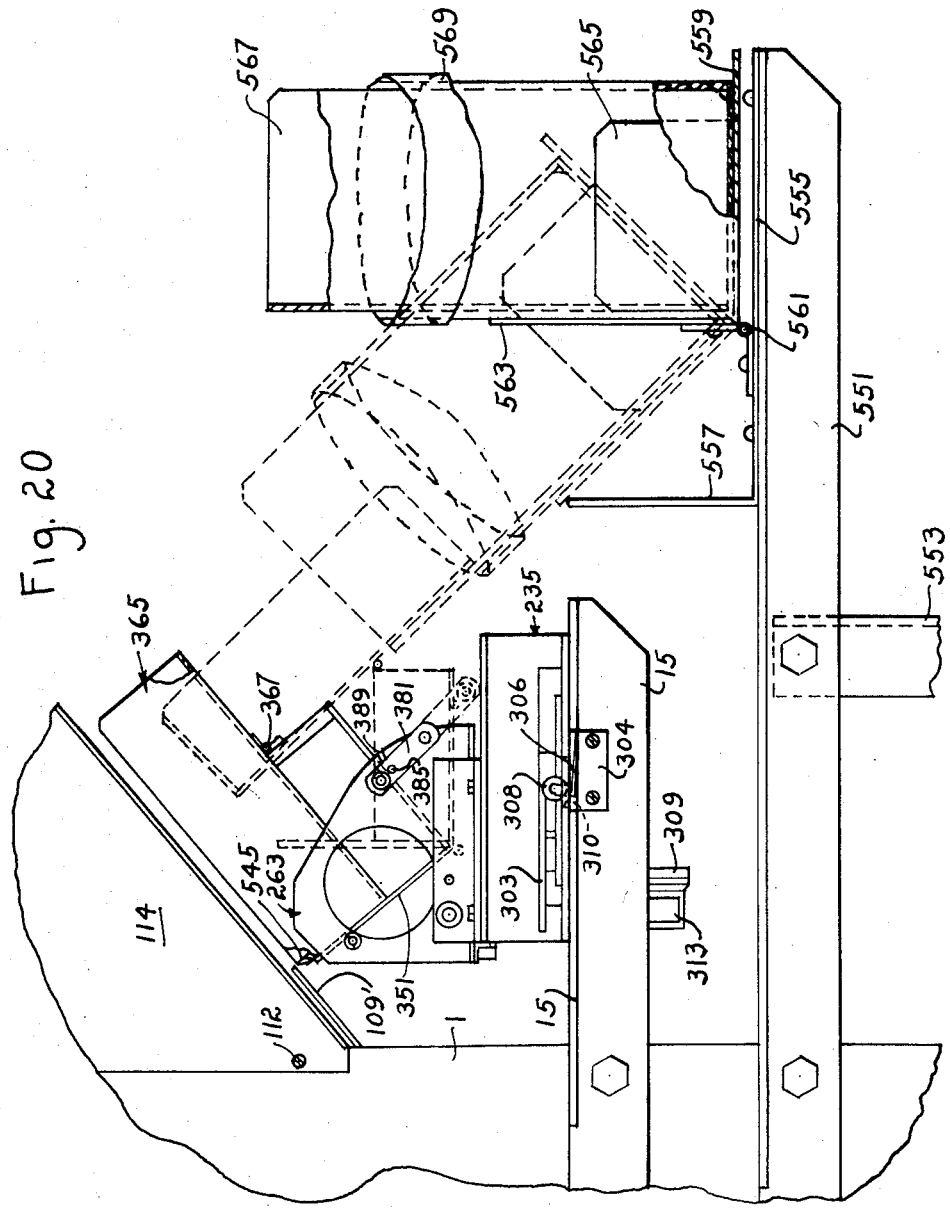

United States Patent Office 2,918,766
Patented Dec. 29, 1959

2,918,766

ROLL HANDLING MACHINE

Clarence F. Rogier, Chicago, Thomas E. Kulo, Glenview, and Joseph Singer, Chicago, Ill., assignors to Johnson Fare Box Company, Chicago, Ill., a corporation of Delaware Application March 19, 1952, Serial No. 277,458

24 Claims. (Cl. 53—74)

This invention relates to a machine for printing, stop-counting and stacking rolls of coins, that is, coins which have been inserted in cylindrical coin wrappers, the ends of which have been spun over to hold the coins in the wrapper.

The machine for performing the spinning and other operations is disclosed in our copending application, Serial No. 378,290, filed September 3, 1953 for Coin Roll Filling and Crimping Machine now Patent No. 2,804,737, issued September 3, 1957.

It is an object of the invention to produce a machine of the kind described which will print the wrappers at a relatively high rate of speed.

Another object is to provide a machine which will operate continuously, starting a new predetermined count as soon as one has been completed.

A further object of the invention is to provide a machine which is adjustable to handle any one of a number of denominations of coins.

It is another object of the invention to produce a machine which will require, only periodically, the attention of the operator.

These and other objects will become apparent from a study of this specification and the drawings which are attached hereto and made a part hereof and in which:

Figure 1 is a side elevation showing portions of the drive train and package receiving mechanism.

Figure 2 is an elevation of the side opposite that shown in Figure 1.

Figure 3 is a rear elevation of the machine showing the package receiving mechanism.

Figure 4 is an elevation with parts in section showing the input and output conveyors and the printing mechanism.

Figure 5 is a sectional view taken substantially on line 5—5 of Figure 4 showing the printing and roll feeding and guiding means.

Figure 6 is a sectional view taken on line 6—6 of Figure 4 showing the input conveyor drive.

Figure 7 is a plan view taken substantially on line 7—7 of Figure 4 showing the roll guiding, moving and printing means.

Figure 8 is a sectional view taken substantially on line 8—8 of Figure 4 showing the drive for the output conveyor.

Figure 9 is a sectional view taken on the line 9—9 of Figure 4 showing the spring finger pressure applying mechanism.

Figure 10 is a sectional view taken on line 10—10 of Figure 4 showing the printing roll and cam drives.

Figure 11 is an elevation of the roll pressure mounting means located in the upper right portion of Figure 4.

Figure 12 is a sectional view taken substantially on line 12—12 of Figure 13 showing the input to the conveyor drives.

Figure 13 is a sectional view taken substantially on line 13—13 of Figure 12 showing the overload clutch.

Figure 14 is a sectional view of the electro-pneumatic time delay mechanism.

Figure 15 is a plan view of the roll receivers and shifting mechanism.

Figure 16 is a sectional view taken substantially on line 16—16 of Figure 15.

Figure 17 is a plan view of the shifting mechanism of Figure 15 with the carriage removed and parts of the top plate broken away.

Figure 18 is a sectional view taken on line 18—18 of Figure 15 showing a roll receiver being loaded from the output conveyor and showing the carriage and the latching mechanism.

Figure 19 is a schematic wiring diagram of the entire machine.

Figure 20 is an end elevation of a modified roll receiver in which bags are used instead of boxes.

Figure 21 is a sectional view of a modified form of coin roll receptacle.

FRAME STRUCTURE

Figure 3B:
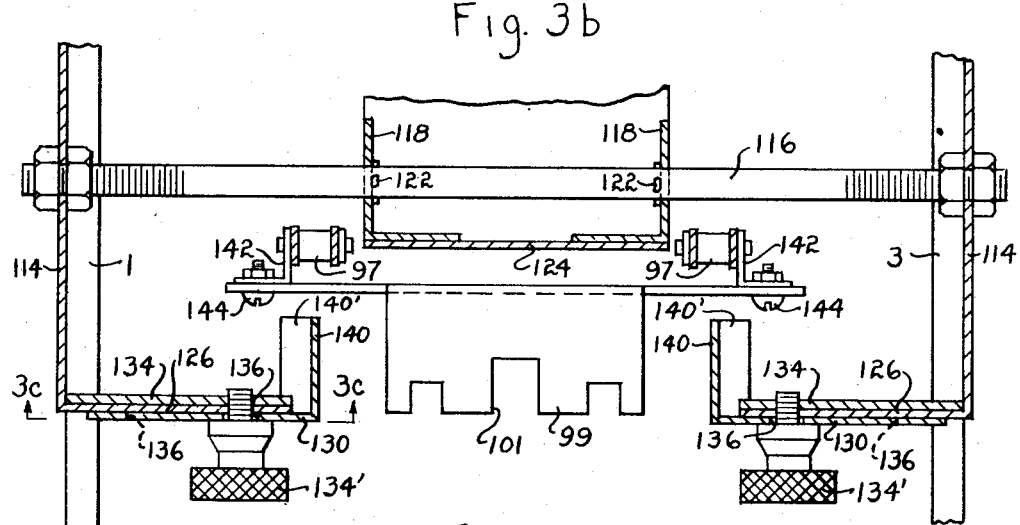
Figure 3b is a sectional view of the output conveyor taken substantially on the line 3b—3b of Figure 1 showing the coin roll guides.
Figure 3A:
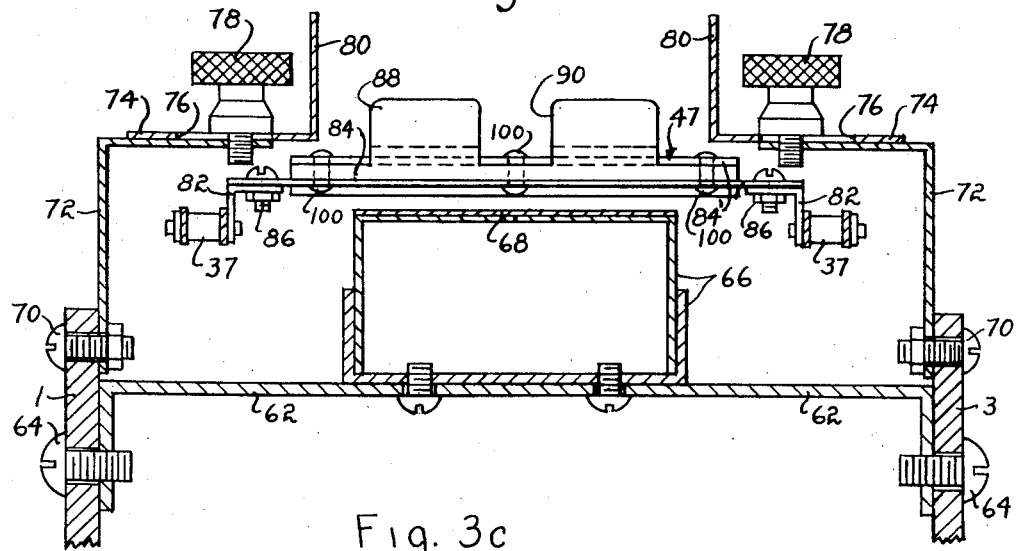
Figure 3a is a sectional view of the input conveyor taken substantially on the line 3a—3a of Figure 1 showing the coin roll guides and adjustments.
Figure 3C:
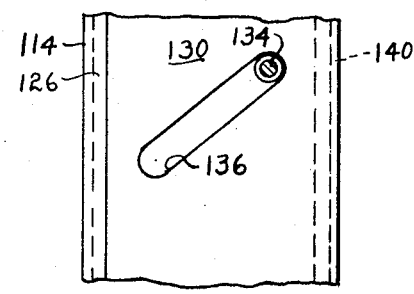
Figure 3c is a sectional view taken substantially on line 3c—3c of Figure 3b showing the adjustment mechanism for the lateral coin roll guides.

*Figures 1, 2, 3*

Referring particularly to Figures 1, 2 and 3 the numerals 1 and 3 represent the side frames of the machine which are suitably fixed together in spaced relation by spacers 5 and fasteners 7.

Fixed to the frames are brackets 9 which support a chute 11 leading from the packaging machine (not shown) to the input conveyor which is indicated generally by numeral 13.

Additional brackets 15 fixed to the side frames support the roll receiver mechanism which is indicated generally by numeral 17.

A motor 19 is suitably mounted on a base 21 which is supported by the side frames.

INPUT CONVEYOR

*Figures 1, 2, 3, 3a, 4*

To support the lower sprockets of the input conveyor 13, a lug 23 is fixed to each side frame and an adjusting screw 25 is threadedly mounted in each lug. Each screw is rotatably connected with a bearing plate 27 which is mounted on its side frame for sliding parallel to the length of the conveyor. Each plate carries a bearing 29 which receives the shaft 31 on which are spacedly mounted two sprockets 33. A lock nut 35 on the screw maintains the plates in their adjusted positions. The shaft, of course, occupies elongated slots in the frames to permit it to move to increase or decrease the tension on the conveyor chains 37.

The conveyor chains 37 are supported at their upper ends (Figures 4, 6) on sprockets 39, mounted on a shaft 41 which is supported in bearings 43 mounted in the frames. A sprocket 45 is fixed to the shaft to drive it.

As shown in Figure 4, the chains 37 are connected by transverse shelves 47 which support the rolls of coins. The sprockets 39 are rotated in a counterclockwise direction as shown by arrow A in this figure.

Referring to Figure 3a, a number of brackets 62 are attached to the frame members 1, 3 by fasteners 64 and each bracket supports centrally thereon, a rectangular bracket 66. A plate 68 is fixed to the tops of the brackets 66 to serve as an inclined plane upon which the coin rolls rest as they are lifted by the conveyor shelves.

The upper end of the plate 68 tangentially abuts a roller 40 which is fastened to the shaft 41 between the sprockets 39 so that the coin roll will be supported by the plate and the roller until it is deposited on the platform 183 (see Fig. 4).

Also fixed to the frame members 1, 3 on both sides of the conveyor by bolts 70 are angle members 72 which extend substantially the full length of the conveyor 37.

To the inwardly directed legs of the angles, near the bottom ends thereof are pivotally mounted the angular end guides 74 for the coin rolls. Near their upper ends, the guides are each provided with a lateral slot 76 which receives a thumb screw 78 mounted in the corresponding angle member 72.

The upright legs 80 of the guides serve to contact the ends of the coin rolls to properly center them with respect to the conveyor, at least by the time they reach the discharge end thereof.

Fixed to certain links of the conveyor chains 37 are angles 82 to which is secured a bar 84 by bolts 86. Conveyor shelves 88, which are preferably made of molded rubber, are clamped between the bar 84 and a shorter bar 84' by rivets 100. The shelves are each provided with a central notch 90 which provides clearance for the projection 92 of the platform 183 (Figs. 4 and 7) described below. It will also be noted that the shelf is of less width than the platform 183 so that the endwise projections 94 located at the sides thereof (Fig. 7) will flank the ends of each shelf as it passes the platform. In this way the coin rolls carried by the shelves of the conveyor are transferred to the platform.

POWER DRIVE TO INPUT CONVEYOR

Figures 1, 2, 12, 13

The motor has an output pinion 49 which drives a gear 51 which is fixed to the driving member 53 of the overload clutch 55. This member has a pair of dogs 57 which are held by springs 59 in V-shaped notches in the collar 61 which is fixed to shaft 63. Should the shaft be stopped or unduly retarded, the springs will yield and the dogs will ride out of the notches to permit the gear 51 to rotate relative to the shaft. The tension of the springs 59 may be varied by adjusting the nuts 65 on the spring anchor screws 67.

Shaft 63 is supported in bearings 69 in frames 1 and 3, projects through frames 1 and 3 and carries a sprocket 71 adjacent frame 3 and a gear 73 adjacent the other frame.

A shaft 75 is mounted parallel to shaft 63 in bearings 77 supported by frames 1 and 3 and projects through the latter. This shaft carries a gear 79 at one end which meshes with gear 73 and a sprocket 81 on the other end.

As seen in Figure 2, the sprocket 71 is connected by chain 83 to the sprocket 45 of the input conveyor to drive it in the direction of the arrow B (Fig. 2).

An idler sprocket 85 is adjustably mounted on frame 3 in contact with chain 83 to take up slack therein.

OUTPUT CONVEYOR

Figures 2, 4, 8, 18

A shaft 87 is mounted in bearings 89 which are supported in the frames 1, 3 and extends through the frames. The shaft carries a sprocket 91 at the end adjacent frame 3 which is connected by chain 93 to the sprocket 81. The chain moving in the direction of arrow C (Fig. 2) imparts a clockwise rotation of the shaft 87 as indicated by arrow D (Fig. 4).

The shaft has fixed to it two spaced sprockets 95 which carry the chains 97 of the conveyor. Three pairs of equally spaced shelves 99 are connected to the two chains to transport the rolls. In each pair of shelves, the lead shelf is reversed on the chains so that the upright members of each pair face one another, as shown in Figure 4, to form a pocket for the reception of a coin roll. The conveyor chains and shelves move in the direction of the arrow E (Fig. 4).

As shown in Figures 8 and 18, the shelves are notched at 101 to clear roller 103 (Figs. 4 and 18) which projects into the path of a roll of coins. The roller is carried on the actuating arm 105 of a normally open switch 107 and serves to close the switch each time it is depressed by a roll. If no roll is engaged by the shelf the switch will not be actuated.

Referring to Figures 1 and 2, fixed to the side frames 1 and 3 by fasteners 112 are a pair of wing plates 114 which extend laterally from but parallel with the frame.

A number of stay rods 116 are mounted in and extend between said plates (Fig. 3b). Supported on each rod is a pair of angles 118, the free legs of which are fastened to a baffle 124 which extends along the lower reach of the output conveyor and substantially in the same plane as the pitch lines of the chains as shown in Figure 18. The baffle is held in a central position with respect to the conveyor by the cotter pins 122 which enter the rod 116 and abut the legs of the angles which are mounted thereon.

As shown, particularly in Figure 4, the lower end of the baffle 124 tangentially abuts a roller 156 which is fastened to the shaft 87 between the sprockets 95. The baffle lies substantially along the pitch line of the conveyor chains.

Referring to Figure 3b, the plates 114 have inwardly directed flanges 126 along their lower edges and a strip 134 is fixed to the inner surface of each flange.

An angle shaped guide leg 130 is mounted on each flange and has a leg 140 directed toward the conveyor which serves as an end guide for the coin rolls.

The guides are mounted on the flanges by means of thumbscrews 134' which enter slots 136 in the guides and which are threadedly engaged in the flange and strip. The slots are disposed at an angle to the guide leg 140 so that as the guides are moved longitudinally in one direction or the other they will also be moved toward or away from each other to alter the distance between them to accommodate coin rolls of different lengths.

The lower ends of the guide legs 130 are cut away and the lower ends of the guide legs 140 are bent to diverge from each other as shown at 140' (Figs. 3b and 4) so as to guide all coin rolls to a central position with respect to the conveyor which position is determined by the guide legs 140.

A pair of complementary saddle blocks 148 are fastened, one to each frame element 1, 3 (Figs. 4 and 8). These blocks have lugs 111 which extend toward each other.

Fastened to the blocks by screws 150 is a curved chute or guide 109 for the coin rolls. The chute is bent through an arc of substantially 130 degrees and terminates at a point adjacent the guide flanges 140' in a tangential end 109' which is parallel to the lower run of the conveyor (Figs. 4 and 18). At the other end 109" the chute is bent outwardly into the path of the cam fingers 181 which pass through slots 113 in the chute so as to prevent a roll of coins from being carried along with said fingers (Figs. 4 and 8).

The roller 103 and arm 105 described above project through the portion 109' of the chute 109 into the path of the coin rolls.

As shown in Figure 3b, angles 142 are fixed to the chains 97 at intervals and shelves 99 are affixed thereto by bolts 144.

Extending laterally from the frames 1, 3 (Fig. 2) are bars 115 to which are pivoted at 160 on the bell cranks 162 at the ends of which are carried bearings 164 in which are mounted by the shaft 117 to which are fixed in spaced relation therealong, the sprockets 119 for the upper end of the conveyor.

The other arms of the cranks have depending angle members 166 provided with horizontal flanges 168 which underlay the bars 115 and carry adjusting screws 170 which bear on the bars. Thus to adjust the tension of the conveyor it is necessary merely to adjust the screws 170.

PRINTING MECHANISM

*Figs. 1, 4, 5, 8 and 10*

It will be seen from Figures 1 and 8 that shaft 87 carries at the end adjacent frame 1 a sprocket 121 which is connected by a chain 123 to a sprocket 125 fixed to shaft 127 which is mounted in suitable bearings 128 in the frames.

The shaft has fixed to it the pairs of gears 129 and gear 131 (Figs. 4 and 5).

A countershaft 133 is mounted to rotate in bearings 135 supported by the frames and has fixed to it a gear 137 which meshes with gear 131. Also fixed to the shaft by screws 132 is the split printing segment 139 which carries the rubber type slug or printing plate 141. A pair of flanges 143 are fixed to the ends of the segment and serve to limit the amount of compression of the printing type as it passes into contact with the coin roll so as to prevent distortion of the type and improper printing.

An inking roller 145 is fixed by means of a pin 146 to a shaft 147 which is mounted in a rocker frame 149 (Figs. 4 and 10). This frame comprises a pair of side plates 151 which are mounted abutting shoulders 152 formed on a shaft 153, the ends of which are supported in bearings 155 on the frames 1, 3. Spring clips 154 enter grooves in the shaft to hold the side plates against the shoulders.

An ink trough 157 is supported on the rocker frame and a pick-up roller 159 is rotatably mounted on a shaft 161 supported at its ends in the rocker frame. The roller 159 is disposed partly in the trough so that it will run in the ink.

A spreader 163 is fixed to the trough and bears against the side of roller 159 which is leaving the trough so as to spread the ink evenly and transversely thereof. The spreader also serves to remove excess ink.

A turnbuckle 165 is connected between a pin 167 fixed to the rocker and a pin 169 on the frame 3 to hold the inking roller against the printing plate. The inking roll 145 is driven from a gear 173 which is fixed to shaft 133 through a gear 175 which is fixed to the roll shaft 147.

PRINTING STATION ROLL FEED MECHANISM

*Figs. 4, 5, 7, 8, 10*

Referring to Figure 5, the gears 129 on shaft 127 drive a pair of gears 177 each of which is connected to drive a cam 179. Each cam carries the radially directed fingers 181 which are spaced 120 degrees from each other.

A platform 183 (Figs. 4, 5 and 6) is fixed to the lower sides of a pair of rails 185 by means of fasteners 187. The rails are fixed to the frames 1, 3 by fasteners 189. The platform is provided with a central slot 191 which extends from the end adjacent the output conveyor nearly to the opposite end. The printing segment and the cams 179, 181 extend up through the slot. A finger 180 is provided on the platform to project into the slot 191 and is substantially tangent to the flanges 143.

A pair of guide members 193 have horizontally extending flanges 195 which are slotted at 197 and which are held in adjusted position by thumbscrews 199 which enter the rail. The guide members may thus be adjusted toward and away from each other to accommodate coin rolls of different lengths and to position the rolls with respect to the printing plate. Guide members 193 each have an extension member 200 spot welded to the outside thereof and which project downwardly inside of the lugs 111.

ROLL PRESSURE MECHANISM

*Figs. 4, 5, 6, 7, 8, 9, 11*

A pair of blocks 201 (Figs. 4, 5 and 11) are fixed to the inner sides of the frames 1, 3 by screws 203 so as to extend toward each other. A yoke plate 205 is attached to the blocks by means of screws 207 which pass through slots 209 in the plate and enter the blocks.

A number of holes 211 are formed in each block on a line which diverges from the longitudinal axis of the slot. A corresponding number of holes 213 are formed in the yoke plate which also diverge from the axis of the slot but on a line which lies at a greater angle than the first mentioned line of holes. Corresponding holes in the block and yoke plate lie on a line which is parallel to the axis of the slot. A pin 215 is adapted to enter a hole in the plate and the corresponding hole in the block to position the yoke plate at a predetermined level above platform 183 as shown in Figure 5. As is clearly shown in Figure 11, this level is different for each pair of holes.

The yoke plate 205 has an arm 217 which extends at an angle thereto and generally parallel to and above the platform 183. The arm terminates in an upwardly open U-shaped portion 219 as shown in Figure 9. Two pairs of studs 221, 223 are fixed in the arm within said portion and extend upwardly therefrom. The studs are spaced from each other and positioned substantially at the corners of a rectangle. A coil spring 225 is mounted on each stud and a pair of spring fingers 227 which bow downwardly are disposed one on each pair of studs between the bottoms of the springs and the arm 217. The springs are held in place by washers 229 and screws 231 one of which enters each stud.

The fingers 227 may thus move up and down against the force of the springs 225 to yieldably hold a roll of coins down toward the printing mechanism.

CARRIAGE MECHANISM

*Figs. 15, 16, 17, 18*

Referring particularly to Figures 15 and 17 the arms 15 which are fastened to the frames 1, 3 by means of bolts 233 support at their free ends a box-like structure 235 which comprises a top plate 237, a bottom plate 239 and end blocks 241 to which the two plates are fastened by screws 243. The bottom plate is attached to the arms 15 by screws 245.

A pair of angle brackets 247 are fixed to the top plate by screws 249 with their upwardly extending legs parallel and a guide bar 251 extends between the brackets and is held in place thereby by collars 253 which are suitably fastened to the bar.

A number of rollers 255, preferably three in number, project through slots 257 cut in the top plate 237 (Figs. 15, 18). Each roller has trunnions 259 which are supported in a bracket 261 fixed to the lower side of the plate. The axis of the rollers are parallel and are transverse to the axis of the guide bar 251.

A carriage 263 (Figs. 15, 16) which is substantially E-shaped, has a bottom 265, two ends 267, and a central partition 269. Bushings 271 are fixed to the ends and are adapted to slidably receive the guide bar 251. The bottom of the carriage rests on one or more of the rollers 255 so that the carriage can be readily moved from one end to the other of the bar.

Rubber bumpers 273 are fixed to the brackets 247 in position to contact the ends 267 of the carriage as it is moved to its extreme positions on the rod 251.

CARRIAGE SHIFTING MECHANISM

*Figs. 15, 16, 17*

A stud 275 (Fig. 16) is fixed to the bottom 265 of the carriage 263 and projects downwardly through a slot 277 formed in the top plate 237.

A stud 281 is riveted into the bottom plate and extends upwardly therefrom. The stud 281 serves as a journal for a gear 283 which lies adjacent plate 239 and which has a relatively long lever 285 fixed to its hub 287. The free end of the lever carries an upwardly extending pin 289 and a long helical tension spring 291 is connected to the pin and to the end of stud 275.

A washer 293 is clamped to the stud by a screw 295 which enters the stud to hold the lever and the gear on the stud.

A second stud 297 is also fixed in the bottom plate. A disc 299 having teeth 301 cut into a portion of its periphery is mounted for oscillation on the stud. A lever 303 is fixed to the gear by screws 305. The gear teeth 301 mesh with the teeth of gear 283.

The lever 303 extends through a slot 307 (Fig. 17) in one end wall so that its movement will be limited to an arc as shown in this figure. The ratio of the diameters of the gear 283 and gear teeth 301 is such that movement of the lever 303 from the full to the dashed line position in Figure 17, which covers an arc of 60 degrees, will rotate the lever 285 through 180 degrees in the direction of arrow F to the dashed line position in this figure.

A bracket 302 is fixed to the bottom of the bottom plate 239 and supports a normally closed switch 304 which has an actuating arm 306 on the end of which is mounted a roller 308. The latter projects through a hole 310 in the bottom plate 239 (Fig. 17), into the path of the lever 303 so that each time the lever is moved through its arc of movement the switch is opened momentarily and reclosed.

CARRIAGE LATCHING MECHANISM

Figs. 16, 17, 18

As shown in Figure 18, an angle bracket 309 has one face fixed to the bottom plate 239 by bolts 311 and depends therefrom. To the other face of the bracket is attached a solenoid 313 which has an armature 315. Pivotally attached to the armature at 317 is a latching plunger 319 which is guided in holes 321 and 323 in the top and bottom plates respectively.

A helical compression spring 325 is confined between the bottom plate and a collar 327 which is fixed to the plunger. The collar also abuts the top plate to limit the movement of the plunger. The portion of the plunger which projects through the top plate is bevelled at 329 and enters one or the other of two holes 331 in the bottom 265 of the carriage, depending upon which of the two positions the carriage occupies.

When the latching plunger is withdrawn by the solenoid, the spring 291 will shift the carriage. The plunger then enters the other hole 331 to hold the carriage whereupon the lever 303 may be operated to swing the lever 285. This applies the tension of spring 291 to the carriage in the opposite direction so that when the solenoid is again energized, the spring will shift the carriage in the opposite direction.

RESTORING SWITCH

Figs. 16, 17, 18

A sweep switch 333 which is normally closed is mounted on the bottom side of the top plate 237 by means of screws 335. An actuating lever 337 is pivotally mounted on the switch at 339 and carries, at its free end, a roller 341.

Fixed to the left side of the carriage (Fig. 18) is a cam 343 which has two wings 345 which are set at an angle to the direction of motion of the carriage. The cam is positioned at the same level as the roller 341 so that as the carriage moves in either direction, the cam will sweep past the roller to open and reclose the switch.

COIN ROLL RECEIVERS

Figs. 15, 16, 18

Referring particularly to Figure 18, it will be seen that a pair of rods 347, 349 are fixed in the end plates 267 of the carriage.

A V-shaped tilting shelf 351 has an angle 353 fixed to it along the outside corner. The angle is bowed outwardly at 355 to form a bearing for receiving the rod and one wing 357 of the shelf normally rests against the rod 347. The other wing 359 of the shelf is fixed to spacer block 363 by means of screws 361.

A shelf is disposed in each of two compartments of the carriage.

An open ended U-shaped trough 365 has its bottom wall connected by a hinge 367 to the outer end of the spacer block so that the trough can tilt in the same direction as the shelf.

Slidably deposited in the trough is an open topped receptacle 360 which is adapted to receive the coin rolls. The box is provided with a false end plate 371 fixed to its lower end wall and this plate is corrugated transversely at 373, that is in a direction parallel to the direction of the longitudinal axes of the coin rolls which are to be stacked in the box. The radii of the corrugations are substantially equal to the radius of a coin roll so that each successive layer of rolls in the box will be displaced longitudinally of the box relative to the adjacent layers by the distance of a radius so that the rolls will be stacked in the minimum space.

A latching lever 381 is pivotally mounted at 383 on each of the carriage end plates. Each lever carries a pin 385 and a knob 387. The pin rides in an arcuate slot 389 in the associated end plate and projects inwardly adjacent to and below the wing 359 so as to prevent the shelf from tilting about the rod 349. The weights of the trough 365 and of the box 360 are so disposed, because of the tilted condition thereof as shown in Fig. 18, that tilting on the hinge 367 is prevented.

Figure 14 discloses the structure of the time delay relay 419. I prefer to use a relay which is sold commercially under the name "Agastat" and which is fully disclosed in the patent to Lindahl No. 2,489,381. This relay comprises a coil 510, a movable armature 413 which is slidably mounted on a rod 513. A spring 515 is compressed between the armature and a shoulder 516 on the rod.

The lower end of the rod is provided with abutments 517, 519 which are disposed so as to actuate a switch operator 521 which, through horseshoe spring 523 operate the movable contact 525.

The upper end of the rod is connected to a diaphragm 527 which is enclosed in a case 529. The upper chamber 531 formed by the diaphragm and case communicates with the atmosphere through an orifice 533 which is controlled by a needle valve 535. The lower chamber 537 is in open communication with the atmosphere.

By-pass ports 539 are formed in the diaphragm which are valved by rings 541, 543 to prevent the escape of air from the chamber 531 therethrough on the upward stroke of the rod but permit air to pass from chamber 537 into 531 when the rod is moved down by the weight of the armature.

In operation when current is applied to the coil 510, the armature 413 will be lifted to compress the spring 515. Rod 513 is urged upwardly by the spring but its rate of travel is reduced by the rate of discharge of the air from the diaphragm chamber 531 through port 533. The rate of travel of the rod will depend upon the effective size of the orifice.

When the rod has moved far enough to pass the spring 523 over center the spring will quickly close the contacts 525, 509.

When the current is cut off from the coil, the weight of the armature pulls the rod and associated parts downwardly. This action is not resisted by the diaphragm because air enters chamber 531 through the relatively large ports 539 and spring 523 is quickly moved over center to the other side and it reopens the contacts 525, 509.

WIRING DIAGRAM AND ELECTRICAL CONTROLS
Figs. 1, 14, 18, 19

Referring to Figure 1, it will be seen that a control box 391 for most of the electrical control components of the machine is supported by the frame 1 at the top thereof and a signal lamp 393 is mounted on top of the box.

Figure 19 discloses a four-pronged, polarized plug connection 395 which is adapted to be connected with a supply of 115 volts, 60 cycle current and which is connected with two wires 397, 399.

The wire 397 extends through a master switch 401 and then divides into a number of branches. One branch runs to the pilot lamp 403; another to the coin counter switch 405; another runs through the resistance 407 of 4.7 ohms and to a 450 mil. half wave, selenium rectifier 409; yet others run to the armature contacts 411, 413, 415 of the lamp relay 417, the time delay relay 419 and stop relay 421 respectively and still others run to the brushes 423, 425 of the stepping switch contact banks 427, 429 respectively.

The other main 399 passes through a suitable resistance 431 and is divided into a number of branches one of which goes to the stepping magnet 433; another branch goes to the other side of the pilot light 403; still other branches go to the counter motor 435 and the conveyor motor 19; still another branch runs to the 50 mfd., 250 volt condenser 437; another branch runs to the solenoid 313; yet another branch runs through the sweep switch 333 to the magnets of the time and stop relays 419 and 421 and an additional branch passes through the normally closed lamp reset switch 304 and runs to the signal lamp 393 and to the magnet of the lamp relay 417.

A line 441 runs from the output side of the rectifier and branches to the brushes 443, 445 of the contact banks 447, 449 respectively. All of the brushes are connected by a shaft 451 which is driven by a ratchet 453 which is actuated by the stepping magnet 433.

A line 455 is connected with the rectifier 409 by line 441 and leads to a normally open count switch 107 and to the solenoid 457 which actuates the stepping ratchet mechanism 459 of a cyclometer 461. A 12 mfd., 250 volt condenser 463 is connected in parallel with the solenoid by line 465.

The other side of the solenoid 457 is connected by a line 467 to the stepping magnet 433 the other side of which is connected to the main 399. Line 467 is also connected to the armature 469 of the stepping magnet.

The coin counter switch 405 is in series with a printer switch 469' which is in turn connected by line 471 to the motors 435 and 19.

The line 441 is also connected by line 473 to the condenser 437.

It will be seen that brush 445 of bank 449 normally stands on contact 2 of the bank 449 which is a dead contact. Contact 26 is connected by a bus 475 to each of the twenty-three contacts 4 which are equally spaced between the contacts 2 and 26. Two additional contacts 28 and 30 are connected to wire 477 and a final contact 24 is dead.

The brush 443 of bank 447 normally stands on contact 52 which is dead. There are 23 contacts 8 equally spaced between the first contact 4, also dead, and contact 46. The two contacts 48 and 50, disposed immediately beyond contact 46, are connected by wires 477 to a wire 481 which runs from the contact 479 of the stepping magnet 433 to one contact of the reset switch 483, the other contact of which is connected by a wire 485 to the bus 475. A line 487 connects wire 485 to the third contact 46 of the bank 447 which is in turn connected by a bus 489 to all of the contacts 8 of this bank.

The brushes 443 and 445 are disposed 180 degrees apart as are brushes 423 and 425. Each operation of the stepping magnet advances the brushes clockwise from one contact to the next adjacent contact.

With respect to bank 427 all of the 28 contacts except the second and third contacts 54, 56 from the final contact 42 are dead.

Contact 56 is connected by a wire 491 to the winding of the lamp relay 417 to the contact 493 of this relay and to the signal lamp 393 and by a wire 495 to one contact 497 of a selector switch 499.

The other contact 54 is connected to a wire 501 which is connected with the magnets of the stop relay 421 and of the time relay 419 as well as to the contact 503 of the stop relay. Another wire 505 connects the wire 501 with the other contact 507 of the selector switch 499.

Brush 423 normally rests on contact 42.

In the bank 429 all of the contacts are dead except the second and third from the last numbered 58 and 60 which are connected to the two blades of the switch 499 so that when the switch is closed contact 58 will be connected with contact 507 while 60 will be connected with 497.

The contact 509 of the time relay 419 is connected by wire 511 to the solenoid 313.

MODIFIED FORM OF RECEPTACLE Figs. 20, 21

If the coin rolls, after printing and counting, are to be stored in bags instead of boxes, the coin boxes 360 are omitted and additional structure is added to effect the required result.

As shown in Figure 21, each of the troughs 365 is provided with an end plate 545 which is provided with transverse ribs 547 which stagger the alternate layers of coin rolls by half a diameter as described above. The end plate is fixed to the walls of the trough by screws 549.

The box like structure 235, carriage 263, carriage shift mechanism, shelf 351 and trough 365 are otherwise unchanged.

An additional pair of brackets 551 extends from the frame plates 1, 3 parallel with but below brackets 15 and have depending legs 553.

Mounted on the brackets 551 beyond the free ends of 15 is an angle plate 555 which has an upstanding leg 557. A pair of angle plates 559 are mounted on the horizontal leg of the angle plate 555 by hinges 561. The upwardly extending leg 563 of each angle plate 559 is long enough so that it will be stopped by the leg 557 when tilted to the dashed line position shown in Figure 20.

A pair of upwardly extending ears 565 are turned up from either side of the lower leg of the plates 559.

An open ended trough 567 is adapted to be inserted in a bag 569 and the assembly is installed between the ears 565 and against the leg 563. The trough 567 is wider than trough 365.

The angles 559 are so positioned that each is in line with one trough 365 while the other is in the loading station.

This arrangement is such that if it is desired to empty the rolls of coins from the trough 365 which is in alignment with an angle plate 559, into the bag, the angle 559 is tilted to the dashed line position (Figure 20), the lever 381 is moved to its dashed line position to withdraw pin 385 from slot 389 and the shelf 351 is tilted to the dashed line position.

Thereafter the trough 365 is tilted to the dashed line position to enter the end of trough 567 so that the coin rolls will be deposited in trough 567 and bag 569 by gravity.

The parts are then restored to their initial positions, the trough 567 is withdrawn from the bag 569 which is then tied and removed from the machine. An empty bag is then substituted.

ADJUSTMENTS FOR CHANGES IN COIN DENOMINATION

It will be seen from Figure 20 that trough 567 is long enough to receive a considerable portion of trough 365 so that spilling of the coin rolls is precluded.

It will be apparent from the above that a change in the diameter or length of coin rolls being handled will necessitate adjustment of various parts of the machine to accommodate them.

Referring to Figure 3a, it is necessary to adjust the guide rails 80 of the input conveyor to accommodate different lengths of rolls so that they will be centered with respect to platform 183 when they leave the conveyor.

From Figures 4 and 11 it will be seen that it will be necessary to adjust the height of the pressure fingers 227 above the platform to accommodate different diameters. In Figure 11 adjusted positions for dimes, pennies, nickels, quarters and halves are shown.

As shown particularly in Figures 7, it will be seen that the guide rails 193 will have to be adjusted to the length of the coin rolls and to center them with respect to the printing segment.

It will be seen from Figure 3b that the guide rails 140 will have to be adjusted to accommodate the length of the rolls and also to center the rolls so that they will drop freely into the trough 365 or box 360.

Since the diameter of the coin rolls affects the depth of the box or trough required to receive them and since the length of the rolls affects the width of the box or trough required, a separate assembly consisting of the spacer 363, trough 365 and receptacle 360 (if used) is required for each different diameter roll. These assemblies are easily changed by removing the screws 361 (Fig. 18).

It is also necessary in some cases to alter the stop count, depending upon how many rolls are to be filled into a receptacle or bag. This, however, is effected by the electrical mechanism in a manner which is described below.

It will thus be seen that before any coin rolls are run, the machine adjustments just described must be made in order to insure proper operation.

It is of course obvious that suitable markings, indicators and indicia may be provided on the various parts which are to be adjusted relative to each other without invention to indicate the proper setting for each coin roll.

OPERATION

Assuming that all of the necessary adjustments have been made in the machine to accommodate the particular size of rolls which are to be run, the operator will close or open selector switch 499 to produce a count of 25 rolls or 50 rolls respectively. He will see that the register 461 has been reset to zero, that an empty trough 365 or receptacle 360 is positioned to receive the coin rolls and that the lamp 393 is extinguished. We shall assume that the switch 499 is closed to secure a stop count of 25 rolls.

The operator may then close switches 401, 405 and 469 which will start the coin counter and coin packaging mechanism as well as the printer motor 19. Pilot lamp 403 will also be lighted as soon as switch 401 is closed.

As rolls of coins are fed into the chute 11 (Figs. 1 and 2) they are picked up by the shelves 47 of the input conveyor and delivered to the platform 183 down which they roll until they are stopped between the pressure fingers 227 and the platform finger 180. They are picked up by the cam fingers 181 and brought into contact with the printing segment which rolls them along the platform and also imprints the wrappers with the necessary data. When contact with the printing segment is terminated, the rolls are delivered from under fingers 227 by cam fingers 181 and roll down the platform into trough 109 between a pair of shelves 99. The shelves 99 and the cams 179 are so timed that a roll of coins discharged from one of the cam fingers 181 will be deposited into one of the pockets formed by each pair of shelves 99.

As will be seen from Figure 4, the gears 129 and 131 are driven by the same shaft 127. The gears 129 (Fig. 5) preferably have 30 teeth while the gears 177 which drive the cams 179 have 90 teeth so that there is a reduction of 3 to 1 to the cams 179. The gears 131 and 137 which drive the printing segment 139 have 60 teeth each. Thus the cams make one revolution for every three revolutions of the printing segment. However, since there are three sets of fingers 181 on the cams, one set will pass a roll between the printing segment and the pressure fingers 227 for each revolution of the segment, provided a roll is available.

The segment is so timed relative to the cam fingers that it will engage each roll as the latter is moved to the printing zone by the cams.

Since the angular velocity of the segment is three times that of the cams, the coin roll will be rolled along the pressure fingers by the type segment, when the printing member is in contact with the roll, and away from the cam fingers so that control of the coin roll rests in the segment during printing. However, when the printing segment is no longer in contact with the coin roll, the cams will again make contact and eject the roll from the pressure fingers so that it will be discharged from the platform.

As will be seen from Figure 10, inking drive gear 173 is driven by the printing segment shaft 133 and has 80 teeth while the gear 175 which drives the inking roller 145 has 40 teeth so that the angular velocity of the inking roller is twice that of the printing segment. However the radius of the segment is nearly twice that of the inking roller so that there is only a limited wiping action, if any, of the inking roller on the type plate because the peripheral velocities are nearly equal.

The ink pickup roller 159 lifts the ink from the reservoir 157, the blade 163 smooths and spreads the ink on this roller after which it is transferred to the inking roller with further spreading and thence on to the type.

On leaving the platform, the coin roll drops onto the roller 156 between a pair of shelves 99 and is guided on the ends by the guides 200. The conveyor carries the roll past the count switch 107 which is momentarily closed thereby.

Referring to Figure 19 it will be seen that closure of this switch will energize the cyclometer solenoid 457 and advance the cyclometer 461 one step. It will also energize, through wire 467, the stepping magnet 433 which will in turn advance the brushes 443, 445 and 423, 425 one step each. This is effected by the circuit from rectifier 409 through wires 441, 455, count switch 107, solenoid 457, line 467, stepping magnet 433 to main 399.

Referring particularly to Figure 18, the coin roll is then carried up above and beyond the end wall 369 of the receptacle and released so that it will drop into the receptacle. Since the latter is tilted, the first roll will drop and roll to the lowermost corner.

Succeeding rolls will arrange themselves according to the dictates of gravity and as the corner of the box becomes filled, as shown in Figure 18, additional rolls will be carried along over the tops of preceding rolls and will run down along the free faces of these rolls as indicated in the drawing.

The corrugations in the end wall cause successive layers parallel to the bottom of the receptacle to be staggered by half a diameter so that the maximum number of rolls will be stacked in a minimum volume of available space.

The count selector switch 499 (Fig. 19) being closed, the cyclometer and stepping magnet will be actuated once for each closure of switch 107 until 25 operations have occurred, the brush 425 will rest on contact 58 and will extend the main 397 through contact 58, switch 499, lines 505 and 501 to the magnet of the stop relay 421, the contact 503 thereof and the magnet of the time delay relay and since both relays are connected to the other main 399 through the normally closed sweep switch 333, both will be energized.

Relay 421 will close to contact 415, 503 at once but the closing of switch 525—509 will be delayed by the diaphragm as described above (Fig. 14). Since switch 415—503 is connected to main 397 its effect is to hold the relays 419 and 421 energized even though brush 425 moves off contact 58.

The delay in closing switch 509—525 is necessary to enable the last roll of coins counted to be deposited in the receptacle 360 or trough 365 and when the switch does finally close, the main 397 is extended, through the switch, line 511, the latch solenoid 313 to main 399. This withdraws the latch 319 and permits the carriage with the full receptacle or trough to be moved out of alignment with the output conveyor and the empty receptacle or trough to be positioned to receive further rolls.

As the carriage shifts, the sweep switch 333 is opened momentarily to deenergize the relays 419, 421 which open immediately so that the latch magnet 313 is deenergized to permit latch 319 to again engage the carriage to hold it in its new position.

It will also be seen that when brush 425 is on contact 58, brush 445 will be on contact 28 and this energizes a circuit through the stepping magnet as soon as the stepping relay is deenergized by the count switch after the twenty-fifth count. This circuit is from rectifier 409 through line 441, brush 445, contact 28, lines 477, 481, switch 479—469 of the stepping magnet, the magnet to main 399.

The stepping magnet being thus energized moves the brushes 425 and 445 to contacts 60 and 30 respectively and breaks the switch 479—469.

The brush 425 extends main 397 through contacts 60, 497, lines 495, 491 to lamp relay 417, lamp relay contacts and to lamp 393. The other sides of the lamp and relay are connected through the normally closed lamp reset switch 304 to main 399 and are energized. The relay, when energized, closes its switch 411—493 which establishes a holding circuit for the lamp and relay so that they are independent of contact 60, from main 397 through switch 411—493, line 491 to the lamp and relay and to the main 399 through switch 304.

Similarly the brush 445 establishes a second impulse through the stepping magnet from rectifier 409 through line 441, brush 445, contact 30, lines 477, 481, switch 469—479, the magnet 433 to main 399.

The brushes are accordingly again advanced so that now brushes 425 and 445 engage contacts 10 and 24 respectively while brushes 423 and 443 are on dead contacts and the cycle is ready to repeat.

The lamp 393 continues to call the attention of the operator to the fact that the filled receptacle has not been replaced with an empty one or that the trough, if such is used, has not been emptied and that the carriage has not been prepared for a subsequent operation.

When this task has been performed and the lever 303 is swung to its other position, the reset switch 304 is opened momentarily by the lever and this breaks the holding circuit through the signal lamp 393 and the lamp relay 417 so that the lamp is extinguished and relay switch 411—493 is opened.

If we assume that the count is to be repeated, it will be seen that the control will now reside in the banks of contacts 427 and 447 since the brushes 423 and 443 have now been positioned so that they will advance over their associated contacts.

Thus when brush 423 reaches contact 54, the time and stop relays will be energized, the holding circuit will be set up through these relays, the time relay will energize the latch solenoid, the carriage will shift.

Meanwhile since brush 445 has reached contact 28, the stepper magnet will be energized one step to advance the brushes 423 and 443 to contacts 56 and 50 respectively.

The former lights the signal lamp 393 and energizes relay 417 which sets up holding circuits to hold the lamp and relay energized.

Meanwhile contact 50 again energizes the stepping magnet to move the brushes 423 and 443 to contacts 42 and 52 respectively. Thus a full cycle of the brushes has been completed.

The process is repeated until the run of coin rolls has been completed.

The total number of coin rolls packaged is recorded on the cyclometer 461. Should this number be other than a multiple of 25, it will be necessary, before starting another run, to reset the brushes to such a position that either brushes 425 and 445 are on contacts 10 and 24 respectively or that brushes 423 and 443 are on contacts 42 and 52 respectively.

This in accomplished by actuating the reset switch 483. If we assume that brush 445 is on one of the contacts 4 when the switch 483 is closed and held closed a circuit will be set up from rectifier 409 through line 441, brush 445, a contact 4, bus 475, line 485, switch 483, line 481, step magnet switch 469—479, step magnet 433 to main 399 and the step magnet will be periodically energized to advance the brushes until brush 445 reaches contact 28 whereupon the circuit through the reset switch is broken but the automatic reset circuit described above in connection with contacts 28 and 30 restores the brushes to the zero position.

Similarly if the run stops with brush 443 on a contact 8, the circuit from rectifier 409 through line 441, brush 443, contact 8, bus 489, lines 487, 485, switch 483, line 481, switch 469—479, stepping magnet 443 to main 399 is periodically energized until the brush strikes contact 48 whereupon the circuit is interrupted and the brushes are again reset automatically to the zero position.

If we assume now that the next run is to be performed with a count of 50 rolls instead of 25, switch 499 is opened. The cyclometer 461 is reset to zero.

Assuming that the parts occupy the positions shown in Figure 19, when brush 425 reaches the contact 58 which completes the 25 count, the stop and time relays will not be energized because switch 499 is open. However the brush 445 being on contact 28, will start the automatic reset operation of the stepping magnet which restores the brushes to the zero position.

Since contact 60 is also dead, the signal lamp will not be lighted.

Upon the next actuation of the count switch brushes 423 and 443 will start over the contacts and when brush 423 engages contact 54, the time delay and stop relays will be energized as described above to release the carriage. On the next step the signal lamp will be lighted and on the next step of the automatic reset the brushes will be zeroized so that the next closure of the count switch will start a new cycle.

It is of course obvious that the brushes must be restored to zero between successive closures of the count switch 107 and that the carriage must be shifted between the time that the last roll of one count is discharged into the receptacle and the time that the first roll of the next count reaches the receptacle. It is accordingly important that the speed of the conveyors, the speed of the stepping mechanism, during the reset portion of the cycle and the time of the release of the latch of the carriage be properly correlated to produce this result.

When the operation of the machine is to be concluded, the operator will reopen switches 401, 405 and 469'.

It is obvious that various changes may be made in the form, structure and arrangement of parts without departing from the spirit of the invention. Accordingly, applicants do not desire to be limited to the specific embodiment disclosed herein primarily for purposes of

What we claim to be new and desire to protect by Letters Patent of the United States is:

1. In a coin roll handling apparatus, the combination of a roll printing means, a first conveyor for delivering rolls to the printing means, roll receiving means, a second conveyor for delivering rolls from the printing means to the receiving means, a platform disposed between the first conveyor and the second conveyor and adapted to receive the roll from the first conveyor, said printing means disposed below said platform and adapted to project therethrough, resilient means for yieldably holding a roll on the platform and printing means, means for moving the roll on the platform by the printing means and to the second conveyor, a motor, and means connecting said motor to drive said printing means and said conveyors in timed relation with each other.

2. In a coin roll handling apparatus, the combination of a printing apparatus comprising a rotating type element, a platform disposed adjacent the element for supporting a roll, a pair of cam members rotatably mounted coaxially with the type element and adjacent opposite ends thereof, a number of roll engaging fingers on each cam member, corresponding fingers of the two cam members being aligned in a direction parallel to the axis of rotation of the cam members and type element, said platform defining an opening through which the type element and fingers may project, means for driving the cam members and means for driving the type element at a speed which is a multiple of the number of fingers on a cam member.

3. In a coin roll handling apparatus, an inclined continuous conveyor, means for driving the conveyor so that the lower run thereof travels upwardly, a roll supporting track disposed substantially parallel to and closely adjacent the lower run of the conveyor whereby rolls supported by the track will be moved therealong by said conveyor, an elongated roll receiver having a bottom, side walls and an end wall, means for supporting said receiver with the longitudinal axis of the bottom substantially parallel to said track and conveyor and with the end wall substantially subjacent the end of said track whereby rolls discharged from the track will gravitate toward the angle formed by the bottom and end wall, said supporting means including means responsive to a predetermined number of rolls deposited in the receiver for pivoting the receiver about an axis transverse to the bottom and said longitudinal axis.

4. In a coin roll handling apparatus, a roll discharge structure, a carriage, said carriage supporting a number of roll receivers, means mounting said carriage for movement to different stations to position different receivers relative to said structure to receive rolls therefrom, selectively settable means for urging said carriage toward a selected station, means for preventing movement of the carriage, and means actuated in response to the passage of a predetermined number of rolls to a positioned receiver for rendering said preventing means ineffective so that the carriage will be urged to the selected station to position an empty receiver in receiving position relative to the structure.

5. In a coin roll handling apparatus, a roll discharge structure, a carriage, said carriage supporting a number of roll receivers, means mounting said carriage for movement to different stations to position different receivers relative to said structure to receive rolls therefrom, selectively settable means for urging said carriage toward a selected station, means for preventing movement of the carriage, means actuated in response to the passage of a predetermined number of rolls to a positioned receiver for rendering said preventing means ineffective so that the carriage will be urged to the selected station to position an empty receiver in receiving position relative to the structure, and means operable by said carriage during its passage to said selected station for restoring said preventing means to hold said carriage at the selected station.

6. In a coin roll handling apparatus, a roll discharge structure, a carriage, said carriage supporting a number of roll receivers, means mounting said carriage for movement to different stations to position different receivers relative to said structure to receive rolls therefrom, selectively settable means for urging said carriage toward a selected station, means for preventing movement of the carriage, means actuated in response to the passage of a predetermined number of rolls to a positioned receiver for rendering said preventing means ineffective so that the carriage wall be urged to the selected station to position an empty receiver in receiving position relative to the structure, a signal, additional means responsive to the passage of a predetermined number of rolls to said positioned receiver for establishing said signal, and means responsive to a subsequent operation of said selectively settable means for cancelling said signal.

7. In a coin roll handling apparatus, a roll discharge structure having a discharge station, a number of roll receivers, means mounting said receivers for movement to and from said station, selectively settable means for urging a receiver positioned at the station away from it and for urging a selected receiver toward said station, means for holding said receivers against movement by said urging means, means responsive to the passage of a predetermined number of rolls to the positioned receiver for rendering said holding means ineffective and means responsive to the positioning of the selected receiver at the station for rendering said holding means effective to hold it at said station.

8. In a coin roll handling apparatus, a roll discharge structure having a discharge station, a number of roll receivers, means mounting said receivers for movement to and from said station, selectively settable means for urging a receiver positioned at the station away from it and for urging a selected receiver toward said station, means for holding said receivers against movement by said urging means, means responsive to the passage of a predetermined number of rolls to the positioned receiver for rendering said holding means ineffective and means responsive to the positioning of the selected receiver at the station for rendering said holding means effective to hold it at said station, a signal, additional means responsive to the passage of said predetermined number of rolls in said first positioned receiver for establishing the signal and means responsive to the operation of said selectively settable means, subsequent to the establishment of the signal for cancelling said signal.

9. In a coin roll handling apparatus, a carriage, means mounting said carriage for reciprocating movement between two stations, power means associated with said carriage for moving it between stations, selecting means settable to one position to condition said power means for moving the carriage to one station and settable to another position to condition the power means for moving the carriage to the other station, means for holding said carriage at either station and means responsive to a predetermined count of coin rolls for rendering said holding means ineffective whereby said power means is rendered effective to move the carriage to the station selected by said selecting means.

10. In a coin roll handling apparatus, a carriage, means mounting said carriage for reciprocating movement between two stations, power means associated with said carriage for moving it between stations, selecting means settable to one position to condition said power means for moving the carriage to one station and settable to another position to condition the power means for moving the carriage to the other station, means for holding said carriage at either station, means responsive to the passage of a predetermined number of coin rolls for rendering said holding means ineffective whereby said power means is rendered effective to move the carriage to the station selected by said selecting means and means responsive to the passage of the carriage for rendering said holding means effective.

11. In a coin roll handling apparatus, a carriage, means mounting said carriage for movement between two stations, a spring connected at one end to the carriage, a lever, means mounting said lever for pivotal movement, means for connecting the other end of said spring to the free end of the lever, means for selectively positioning the free end of the lever adjacent the stations, so as to urge the carriage toward said station, means for holding said carriage in either station against the action of said spring and means for rendering said holding means ineffective.

12. In a coin roll handling apparatus, a carriage, means mounting said carriage for reciprocating movement between two stations, power means associated with said carriage for moving it between stations, selecting means settable to one position to condition said power means for moving the carriage to one station and settable to another position to condition the power means for moving the carriage to the other station, means for holding said carriage at either station, means responsive to the passage of a predetermined number of coin rolls for rendering said holding means ineffective whereby said power means is rendered effective to move the carriage to the station selected by said selecting means, means responsive to the passage of the carriage for rendering said holding means ineffective and means operable by the carriage in its passage from one station to the other to render said holding means effective.

13. In a coin roll handling apparatus, a carriage, means mounting said carriage for movement between two stations, power means associated with said carriage for moving it between stations, selecting means settable to one position to condition said power means for moving the carriage to one station and settable to another position to condition the power means for moving the carriage to the other station, means for holding said carriage at either station, means responsive to the passage of a predetermined number of coin rolls for rendering said holding means ineffective whereby said power means is rendered effective to move the carriage to the station selected by said selecting means, a pair of shelves, means mounting said shelves in side by side relation on said carriage for tilting about an axis, means for releasably holding said shelves in predetermined tilted positions, a spacer member mounted on each shelf and a coin roll receiver mounted on said member.

14. In a coin roll handling apparatus, a carriage, means mounting said carriage for movement between two stations, power means associated with said carriage for moving it between stations, selecting means settable to one position to condition said power means for moving the carriage to one station and settable to another position to condition the power means for moving the carriage to the other station, means for holding said carriage at either station, means for rendering said holding means ineffective whereby said power means is rendered effective to move the carriage to the station selected by said selecting means, a pair of shelves, means mounting said shelves in side by side relation on said carriage for tilting about an axis, means for releasably holding said shelves in predetermined tilted positions, a spacer member mounted on each shelf and a coin roll receiver hingedly mounted on each spacer with the axis of the hinge substantially parallel to the axis about which the shelves tilt.

15. In a coin roll handling apparatus, a carriage, means mounting said carriage for movement between two stations, power means associated with said carriage for moving it between stations, selecting means settable to one position to condition said power means for moving the carriage to one station and settable to another position to condition the power means for moving the carriage to the other station, means for holding said carriage at either station, means for rendering said holding means ineffective whereby said power means is rendered effective to move the carriage to the station selected by said selecting means, a pair of shelves, means mounting said shelves in side by side relation on said carriage for tilting about an axis, means for releasably holding said shelves in predetermined tilted positions, a spacer member mounted on each shelf and a coin roll receiver hingedly mounted on each spacer with the axis of the hinge substantially parallel to the axis about which the shelves tilt, said axes being substantially parallel to the direction in which the carriage moves between stations.

16. In a coin roll handling apparatus, a carriage, means mounting said carriage for movement between two stations, power means associated with said carriage for moving it between stations, selecting means settable to one position to condition said power means for moving the carriage to one station and settable to another position to condition the power means for moving the carriage to the other station, means for holding said carriage at either station, means for rendering said holding means ineffective whereby said power means is rendered effective to move the carriage to the station selected by said selecting means, a pair of shelves, means mounting said shelves in side by side relation on said carriage for tilting about an axis, means for releasably holding said shelves in predetermined tilted positions, a spacer member mounted on each shelf, a coin roll receiver hingedly mounted on each spacer with the axis of the hinge substantially parallel to the axis about which the shelves tilt, a pair of receptacles each supporting a bag in open condition, means mounting the receptacles for tilting about an axis substantially parallel with the first mentioned axes and toward said carriage, means for supporting said receptacles in a tilted position, one of said receptacles being disposed in alignment with one coin roll receiver when the carriage occupies one station and the other receptacle being disposed in alignment with the other receiver when the carriage occupies its other station, said receiver being open at the end adjacent the bag receptacle so that when the shelf and receiver are tilted toward the aligned receptacle the coin rolls will be directed into the bag.

17. In a coin roll handling apparatus, a carriage, means mounting said carriage for movement between two stations, power means associated with said carriage for moving it between stations, selecting means settable to one position to condition said power means for moving the carriage to one station and settable to another position to condition the power means for moving the carriage to the other station, means for holding said carriage at either station, means for rendering said holding means ineffective whereby said power means is rendered effective to move the carriage to the station selected by said selecting means, a pair of shelves, means mounting said shelves in side by side relation on said carriage for tilting about an axis, means for releasably holding said shelves in predetermined tilted positions, a spacer member mounted on each shelf, a coin roll receiver hingedly mounted on each spacer with the axis of the hinge substantially parallel to the axis about which the shelves tilt, a pair of receptacles each supporting a bag in open condition, means mounting the receptacles for tilting about an axis substantially parallel with the first mentioned axes and toward said carriage, one of said receptacles being disposed in alignment with one coin roll receiver when the carriage occupies one station and the other receptacle being disposed in alignment with the other receiver when the carriage occupies its other station, said receiver being open at the end adjacent the bag receptacle so that when the shelf and receiver are tilted toward the aligned receptacle the coin rolls will be directed into the bag.

18. In a coin roll handling apparatus, a carriage, means mounting said carriage for movement between two stations, power means associated with said carriage for moving it between stations, selecting means settable to one position to condition said power means for moving the carriage to one station and settable to another position to condition the power means for moving the carriage to the other station, means for holding said carriage at either station, means for rendering said holding means ineffective whereby said power means is rendered effective to move the carriage to the station selected by said selecting means, a pair of shelves, means mounting said shelves in side by side relation on said carriage for tilting about an axis, means for releasably holding said shelves in predetermined tilted positions, a spacer member mounted on each shelf and a coin roll receiver hingedly mounted on each spacer with the axis of the hinge substantially parallel to the axis about which the shelves tilt, a pair of receptacles each supporting a bag in open condition, means mounting each of the receptacles for tilting about an axis substantially parallel with the first mentioned axes, and toward the carriage, a chute mounted inside each bag, one of said chutes being positioned by one of the receptacles substantially in alignment with one of said receivers when the carriage occupies one station and the other of said chutes being positioned by the other of the receptacles substantially in alignment with the other receiver when the carriage occupies its other station, said receivers being open at the ends adjacent the receptacles so that when a shelf and receiver are tilted toward an aligned receptacle, the coins will be directed through said chute into the bag.

19. In a coin roll counting apparatus, a count switch, a stepping mechanism connected to be operated in response to said count switch, a stop device, means responsive to said stepping mechanism after a predetermined number of steps for actuating the stop device, means for advancing the stepping mechanism after it has moved a predetermined number of steps, a signal, means responsive to said mechanism upon said last mentioned operation for energizing said signal, means for holding said signal energized, and means responsive to said stop device for disabling said holding means to cancel the signal.

20. In a coin roll counting apparatus, a count switch, a stepping mechanism connected to be operated in response to said count switch, a stop device, means responsive to said stepping mechanism after a predetermined number of steps for actuating the stop device, means for operating the stepping mechanism two additional steps after it has been actuated a predetermined number of steps by said count switch, a signal, means responsive to said mechanism upon the first of said last mentioned operations for energizing said signal and means on said stepping mechanism arranged to be conditioned thereby, upon the second of said last mentioned operations, for repeating the cycle in response to said count switch.

21. In a coin roll counting apparatus, a count switch, a stepping mechanism connected to be operated in response to said count switch, first and second brushes connected to be advanced stepwise by said mechanism, means for energizing the brushes, a device for stopping said counting apparatus, means energized by said first brush after a predetermined number of steps for energizing said device to stop said counting apparatus, means energized by the second brush for energizing the stepping mechanism for an additional step, a signal and means energized by said first brush upon said additional step for energizing said signal.

22. In a coin roll counting apparatus, a count switch, a stepping mechanism connected to be operated in response to said count switch, first, second, third and fourth brushes connected to be advanced stepwise by said mechanism, means for energizing the brushes, a device for stopping said counting apparatus, means energized by said first brush after a predetermined number of steps for energizing said device to stop said counting apparatus, means energized by the second brush for energizing the mechanism for two additional steps, a signal and means energized by said first brush upon said first additional step for energizing said signal, said third and fourth brushes being positioned by said mechanism upon said second additional step to repeat the predetermined count in response to said count switch.

23. In a coin roll handling apparatus, the combination of a roll printing means, a roll discharge means including pick up means operable with the roll printing means to move the roll to and from the printing means, first and second roll receivers, means mounting said first and second receivers for unison movement whereby said first receiver is in a roll receiving position with respect to the discharge means and said second receiver is positioned to be moved into said receiving position, a predetermined count mechanism, means responsive to the passage of a roll through the discharge means for actuating the count mechanism, and means responsive to a predetermined number of actuations of the count mechanism for moving said first receiver and second receiver in unison to position said second receiver in receiving position.

24. In a coin roll handling apparatus, the combination of a roll printing means, a roll discharge means including pick up means operable with the roll printing means to move the roll to and from the printing means in a predetermined time sequence, first and second roll receivers, means mounting said first and second receivers for unison movement whereby said first receiver is in a roll receiving position with respect to the discharge means and said second receiver is positioned to be moved into said receiving position, a predetermined count mechanism, means responsive to the passage of a roll through the discharge means for actuating the count mechanism, means responsive to a predetermined number of actuations of the count mechanism for moving said receivers to position said second receiver in receiving position and means delaying the action of the receiver moving means to afford time for the deposit, in the first receiver, of the roll corresponding to the last of each predetermined number of actuations.

References Cited in the file of this patent

UNITED STATES PATENTS

| | | |
|---|---|---|
| 123,391 | Giffhorn | Feb. 6, 1872 |
| 235,128 | Cook | Dec. 7, 1880 |
| 329,710 | Bricker | Nov. 3, 1885 |
| 985,479 | Waller | Feb. 28, 1911 |
| 1,022,902 | Ware | Apr. 9, 1912 |
| 1,303,042 | Dowson et al. | May 6, 1919 |
| 1,376,435 | Helyer | May 3, 1921 |
| 1,638,850 | Hebrank | Aug. 16, 1927 |
| 1,759,005 | Fuller | May 20, 1930 |
| 1,779,210 | Davis | Oct. 21, 1930 |
| 1,790,143 | Grunberger | Jan. 27, 1931 |
| 1,985,211 | McBean | Dec. 18, 1934 |
| 2,102,995 | Coombs | Dec. 21, 1937 |
| 2,106,975 | Francis | Feb. 1, 1938 |
| 2,109,360 | Shurley | Feb. 22, 1938 |
| 2,171,742 | Dombre | Sept. 5, 1939 |
| 2,204,023 | Mason | June 11, 1940 |
| 2,204,126 | Domke | June 11, 1940 |
| 2,268,797 | Breshear | Jan. 6, 1942 |
| 2,318,598 | Davis | May 11, 1943 |
| 2,346,869 | Poole | Apr. 18, 1944 |
| 2,362,663 | Redin et al. | Nov. 14, 1944 |
| 2,444,210 | Lauricella | June 29, 1948 |
| 2,517,559 | Haigh et al. | Aug. 8, 1950 |
| 2,544,894 | Nelson | Mar. 13, 1951 |
| 2,652,197 | Berger | Sept. 15, 1953 |
| 2,711,275 | Bartlett | June 21, 1955 |

UNITED STATES PATENT OFFICE

CERTIFICATE OF CORRECTION

Patent No. 2,918,766                                December 29, 1959

Clarence F. Rogier et al.

It is hereby certified that error appears in the printed specification of the above numbered patent requiring correction and that the said Letters Patent should read as corrected below.

Column 4, line 72, strike out "by"; column 6, line 51, for "thereby" read -- therein --; column 14, line 20, for "in" read -- is --; line 35, for "443" read -- 433 --; column 16, line 16, for "wall" read -- will --.

Signed and sealed this 7th day of June 1960.

(SEAL)
Attest:

KARL H. AXLINE                                         ROBERT C. WATSON
Attesting Officer                                    Commissioner of Patents